United States Patent
Westerweck et al.

(10) Patent No.: US 6,869,233 B2
(45) Date of Patent: Mar. 22, 2005

(54) IMAGE CAPTURE DEVICE

(75) Inventors: Lothar Westerweck, Hollywood, FL (US); Wilfred Bittner, Tsing Yi (CN); Erwin Scholz, Miramar, FL (US)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 10/668,506

(22) Filed: Sep. 23, 2003

(65) Prior Publication Data

US 2004/0057720 A1 Mar. 25, 2004

Related U.S. Application Data

(60) Provisional application No. 60/413,079, filed on Sep. 23, 2002.

(51) Int. Cl.[7] .................................................. G03B 9/00
(52) U.S. Cl. ...................... 396/460; 396/493; 396/543
(58) Field of Search ................................ 396/458–460, 396/493–497, 500, 507, 543

(56) References Cited

U.S. PATENT DOCUMENTS

| | | | | | |
|---|---|---|---|---|---|
| 3,628,438 A | * | 12/1971 | Loseries | ...................... | 396/487 |
| 3,810,224 A | * | 5/1974 | Kitai et al. | .................. | 396/493 |
| 3,903,538 A | * | 9/1975 | Yoshizaki | .................... | 396/465 |
| 4,200,381 A | * | 4/1980 | Ishizaka et al. | ............. | 396/298 |
| 6,067,424 A | * | 5/2000 | Shono | .......................... | 396/297 |
| 6,628,901 B2 | * | 9/2003 | Naka | ........................... | 396/301 |

* cited by examiner

*Primary Examiner*—David M. Gray
(74) *Attorney, Agent, or Firm*—Scott L. Lampert; Kerry Sisselman

(57) ABSTRACT

An image capture device is provided including more compact components to enable the fabrication of more compact image capture devices. In one particular embodiment, a compact shutter mechanism is provided that requires less space within the camera when the shutter is open. In another particular embodiment, a rotary to linear switch is provided to reduce the amount of real estate required by the switch on the outside housing of the image capture device.

19 Claims, 34 Drawing Sheets

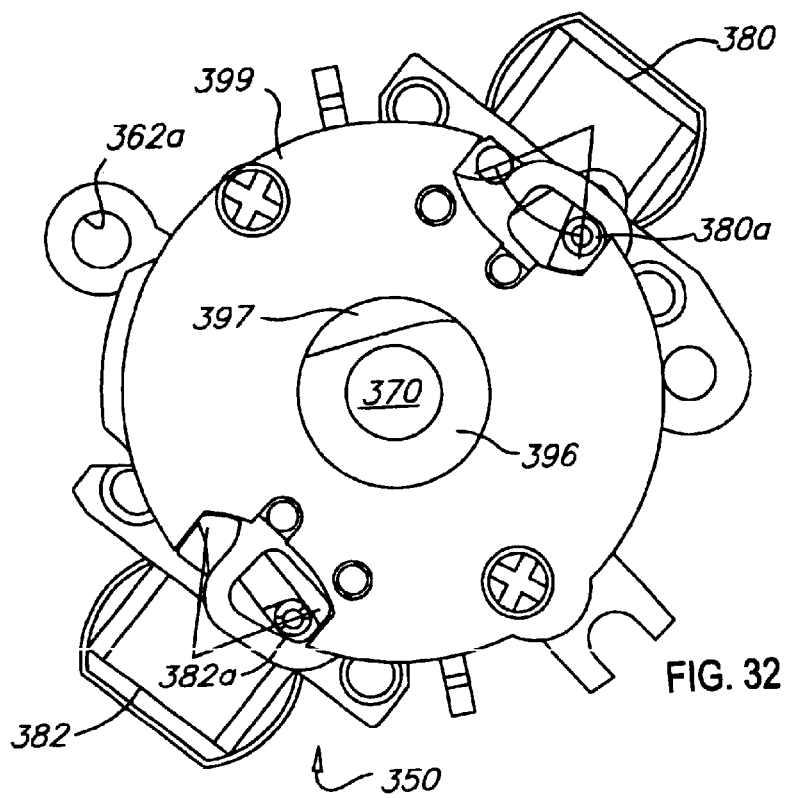
FIG. 32
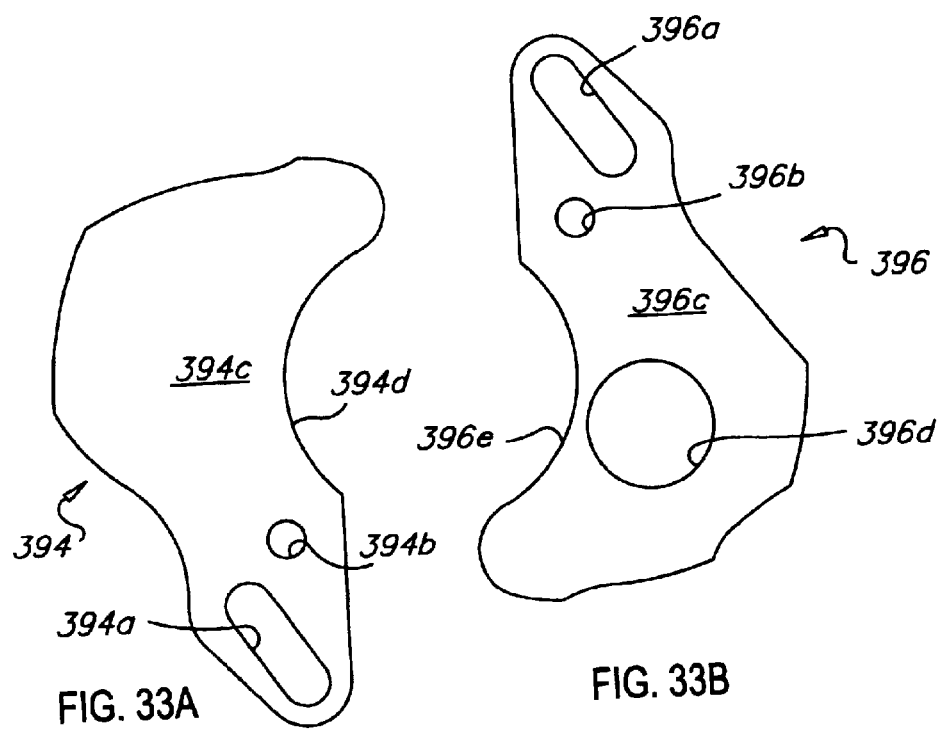
FIG. 33A
FIG. 33B

IMAGE CAPTURE DEVICE

PRIORITY

The present application claims priority from co-pending provisional patent application Ser. No. 60/413,079, Filed on Sep. 23, 2002, entitled IMAGE CAPTURE DEVICE.

FIELD OF THE INVENTION

The present invention relates to image capture devices and more particularly, to a an image capture device including a compact profile wherein certain shutter mechanisms and switch gears have been designed to require less space on the image capture device.

BACKGROUND OF THE INVENTION

There is an interest in making cameras more compact. In order to do so, certain parts on the camera can be designed to take up less space when the parts are activated. For example, some cameras having a mechanical shutter may use a shutter blade the full size of the lens aperture opening. However, if the shutter mechanism were to be mounted in the camera such that the shutter blade swings in the width dimension of the camera, than the camera body may need to be made wider to accommodate the full width of the shutter blade when it has been pivoted away from the lens opening aperture. Additionally, image capture devices presently include linear switches which take up a great deal of surface real estate on the camera housing to provide for the length in which the linear switch slide actuator must be slid in order to move the switch between the selectable positions.

What is needed is to an image capture device that has been designed to be compact. What is further needed are image capture device components that require less space in or on the image capture device to work.

SUMMARY OF THE INVENTION

What is provided are more compact components for an image capture device to enable the fabrication of more compact image capture devices.

In one particular embodiment of a compact image capture device, a compact shutter mechanism is provided that requires less space within the camera when the shutter is open.

In another particular embodiment, a rotary to linear switch is provided to reduce the amount of real estate required by the switch on the outside housing of the image capture device.

In another particular embodiment, other switch components may be combined with a rotary to linear switch, to further take advantage of the space available on the camera housing.

Other particular features and embodiments will become apparent from the following detailed disclosure of the invention.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred, it being understood however, that the invention is not limited to the specific methods and instrumentality's disclosed. Additionally, like reference numerals represent like items throughout the drawings. In the drawings:

FIGS. 8–57 are described herein.

DETAILED DESCRIPTION OF THE PREFERRED EMBODIMENTS

Figure 1:
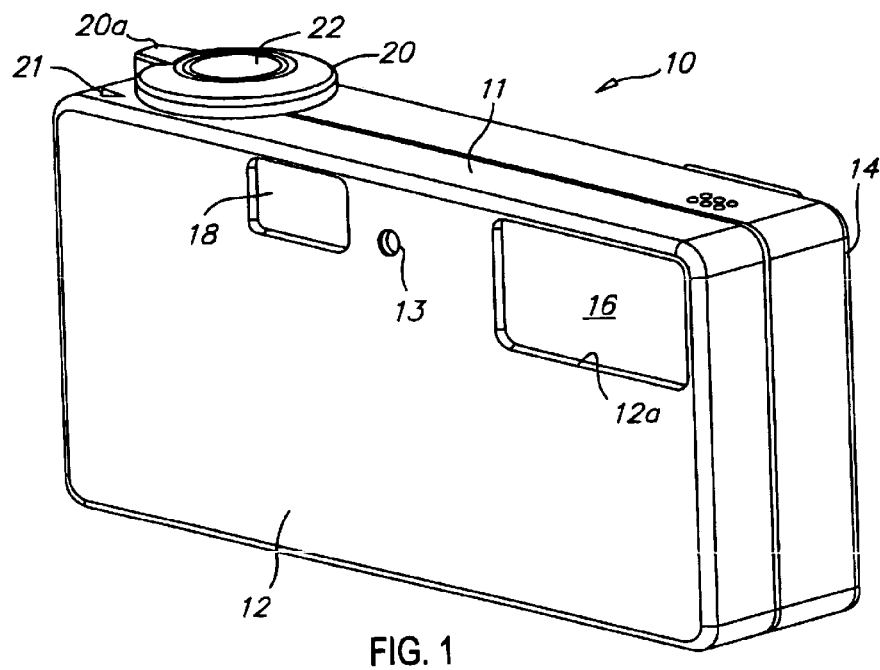
FIG. 1 is a perspective view of an image capture device in accordance with one embodiment of the present inventions.
Figure 2:
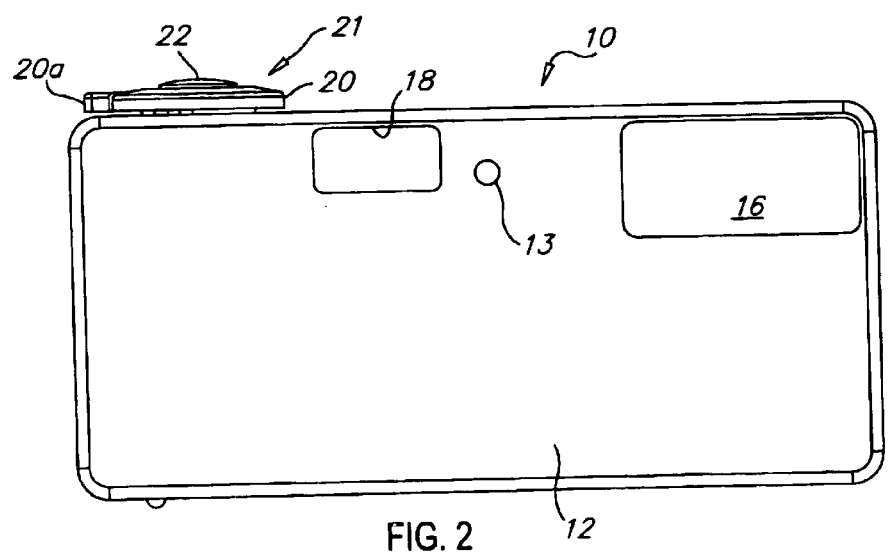
FIG. 2 is a front plan view of the image capture device of FIG. 1.

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

The Image Capture Device Housing

Referring now to FIGS. 1–5, there is shown an image capture device 10 made in accordance with one particular embodiment of the present invention. Image capture device 10 includes a front housing 12 and a rear housing 14 that matingly engage to surround the internal workings of the image capture device 10. A compartment door 15 may engage either or both of the front and rear housings 12 and 14 to provide access to a battery compartment and/or to output connectors. Such output connectors may be used to connect the image capture device 10 to an external device such as a television, a computer a printer, a cell phone, etc.

Figure 3:
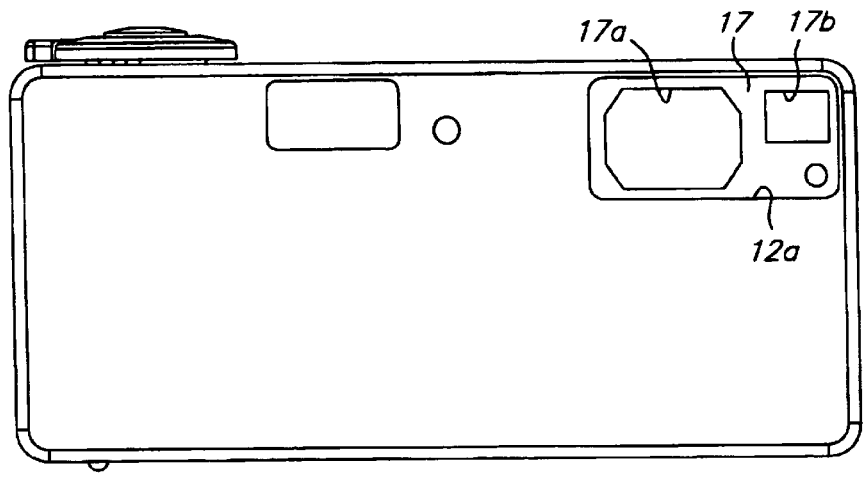
FIG. 3 is a front plan view of the image capture device of FIG. 1 wherein the lens cover has been opened to expose the lens and viewfinder front apertures.
Figure 4:
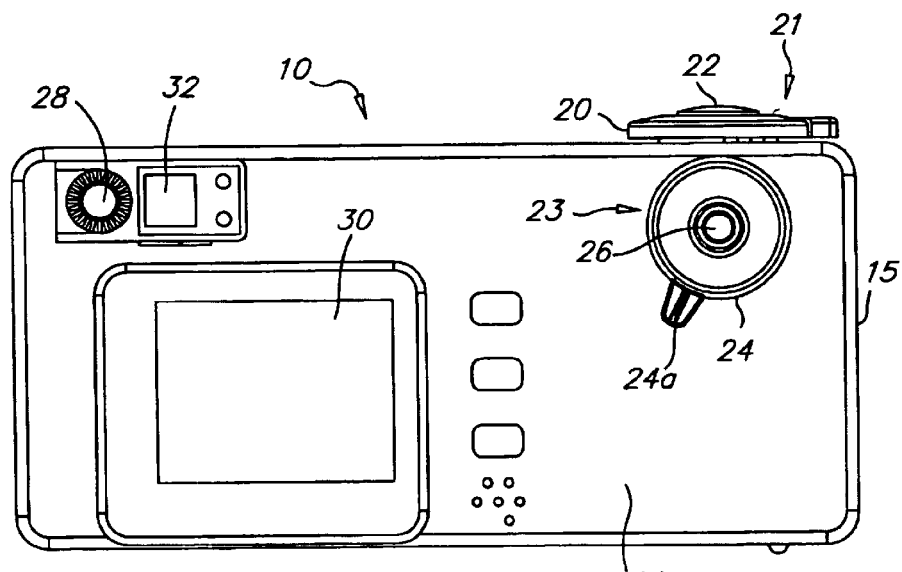
FIG. 4 is a rear plan view of an image capture device in accordance with one particular embodiment of the present inventions.
Figure 5:
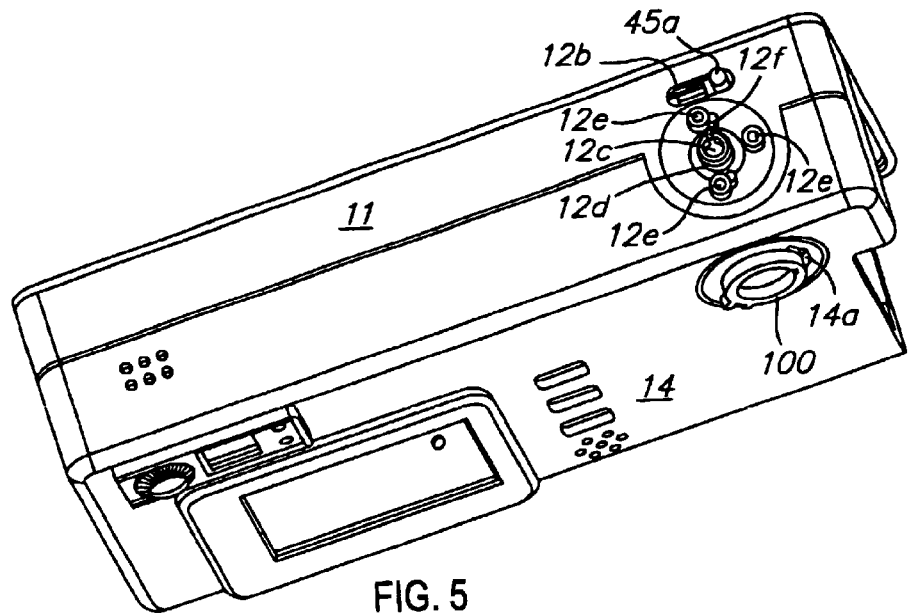
FIG. 5 is a top perspective view of an image capture device in accordance with one embodiment of the present invention having parts removed to more clearly see features of one embodiment.

Front housing 12 of image capture device 10 includes a plurality of apertures formed therethrough, such as a taking lens/viewfinder window 12a, an aperture 13 for a red eye reduction mechanism and a flash window 18. As shown in FIG. 3, when the lens door 16 is opened, the taking lens aperture 17a and viewfinder aperture 17b of the lens mask 17 are exposed.

Rear housing 14 additionally includes a plurality of apertures therethrough. For example, the rear housing 14 of the present particular embodiment includes openings a rotary switch 24, nested tactile switch 26, a rotary diopter adjustment knob 28, an LCD display 30 a view finder rear aperture 32 and signal indicators 34. Other user interface devices, buttons and switches may be included.

A battery door 15 extends across an aperture through a side face of the image capture device 15.

Rotary On/Off Switch with Nested Release Button

Referring more specifically to FIGS. 5–26, front housing 12 additionally includes an aperture 12b and release shaft opening 12c. A cylindrical bearing shaft 12d and three fastener posts 12e additionally extend from the upper surface 11 of the front housing 12. Release shaft post 12d includes a rectangular key opening 12f, therethrough. Door control pin 45a extends through the aperture 12b.

The nested switch assembly 21 is secured to the camera in a novel manner as will be described in connection with FIGS. 6–10. First, referring to FIG. 7, the rotary on/off switch gear 20 is located around the cylindrical bearing shaft 12d on the top surface 11 of the front cover 12 and a hole 20b on the underside of the rotary on/off switch gear 20 is lockingly engaged with the door control pin 45a of a door connector (45 of FIG. 14). The fastener posts 12e pass through openings 20d in the rotary on/off switch 20. Openings 20d additionally include enough space to accommodate fastener posts 12e when the gear 20 is moved in the direction of arrow X, without permitting the gear 20 to be overdriven or turned in the wrong direction. Further, the rotary on/off switch gear 20 includes openings 20e and 20f spaced 35 degrees apart, which will engage an on/off detent mechanism, as will be described in connection with FIG. 8. Although the present particular embodiment shows the openings 20e and 20f as being 35 degrees apart, it can be seen that the system could be adapted to have the openings different distances or angles apart, and the detent spring 60 of FIG. 8, could be likewise adapted. The on/off detent positions of the switch 20 are accomplished using a detent spring finger that moves in and out of two slots of the lens door gear, as will be described more specifically in connection with FIGS. 7 and 8.

Figure 6:
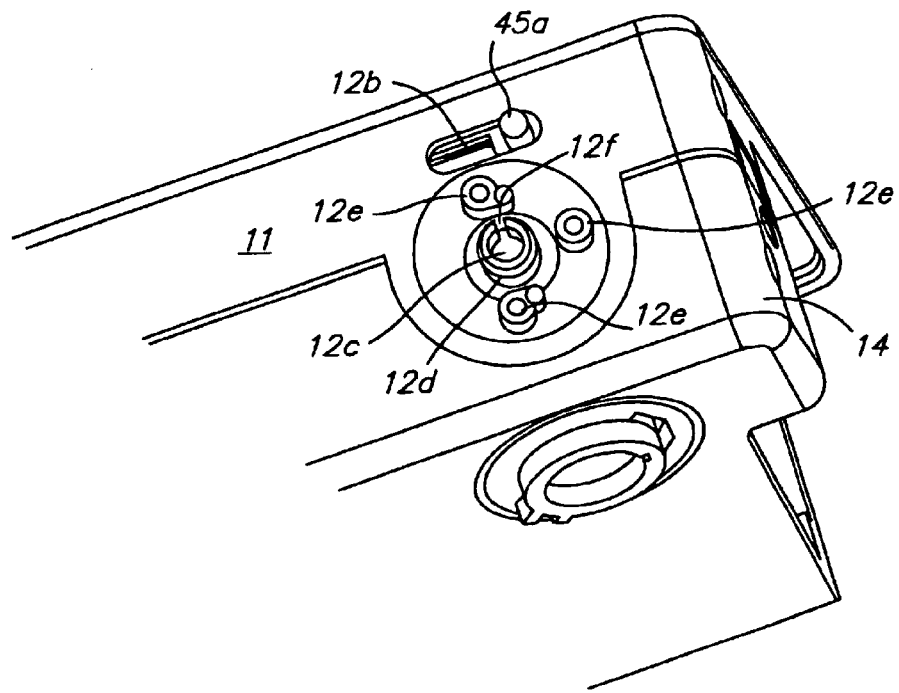
FIG. 6 is an enlarged view of a portion of FIG. 5.
Figure 7:
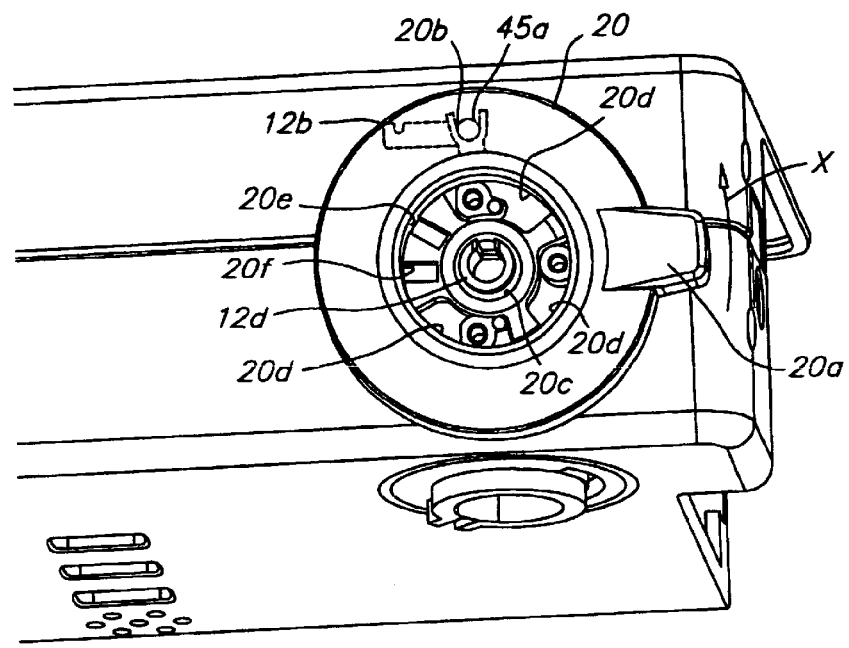
FIG. 7 is a top partial perspective view of an image capture device in accordance with one embodiment of the present inventions having parts removed to more clearly see features of one embodiment
Figure 8:
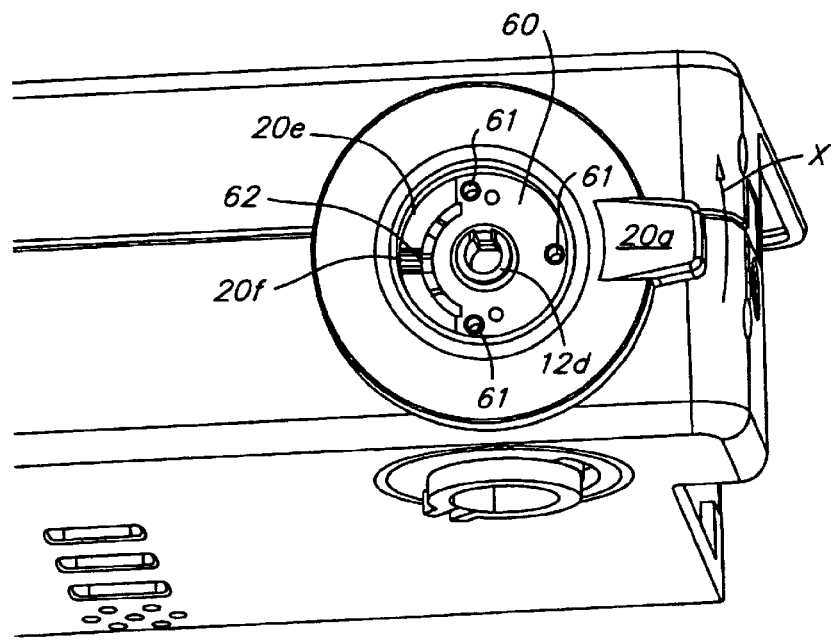

Referring now to FIGS. 7 and 8, an on/off detent spring 60 sits on top of the inner circumference of the rotary on/off gear 20. On/off detent spring 60 has holes 61 that align with holes in the posts 12e (FIG. 6). Additionally, the on/off detent spring 60 includes a spring finger 62. When the rotary on/off switch gear 20 is in an initial position (i.e. the off position), the detent spring finger 62 rests in the opening 20f of the rotary on/off switch gear 20, capturing the switch gear 20 in the off position. When the rotary on/off switch gear 20 is turned in the direction of arrow X, the detent spring finger 62, which is maintained stationary due to screws (74 of FIG. 9) securing them to the top face 11 of the front housing 12. However, when the gear 20 is rotated into its second position (i.e. the on position), the gear 20 rotates about the bearing shaft 12d in the direction of arrow X, and the detent spring finger 62 is captured by the gear 20 in opening 20e. Thus, the switch has two distinct detent positions. It can be seen how other additional switch positions may be added.

Further, as the gear knob 20a, and correspondingly the gear 20, is rotated, the door control pin 45a captured in the hole 20b is moved linearly along the slot 12b. Moving the door control pin 45a moves the door connector (45 of FIG. 14) correspondingly. When the door controller 45 is moved between a first and a second position, a conductive wiper (47 of FIG. 14) is also moved between a first and second position, providing a signal to the processor (not shown) that the rotary on/off switch 21 has moved from an "off" position to an "on" position or vice versa.

Figure 9:
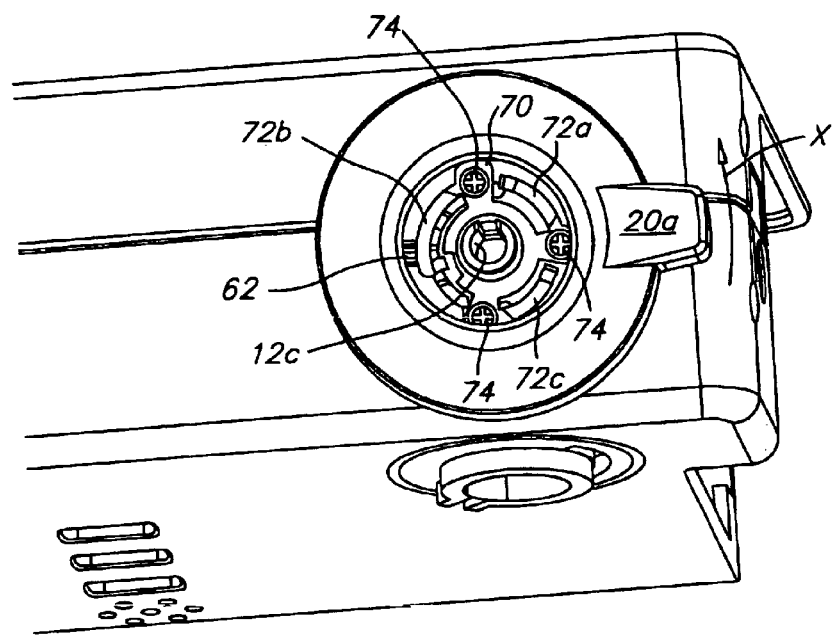
Figure 10:
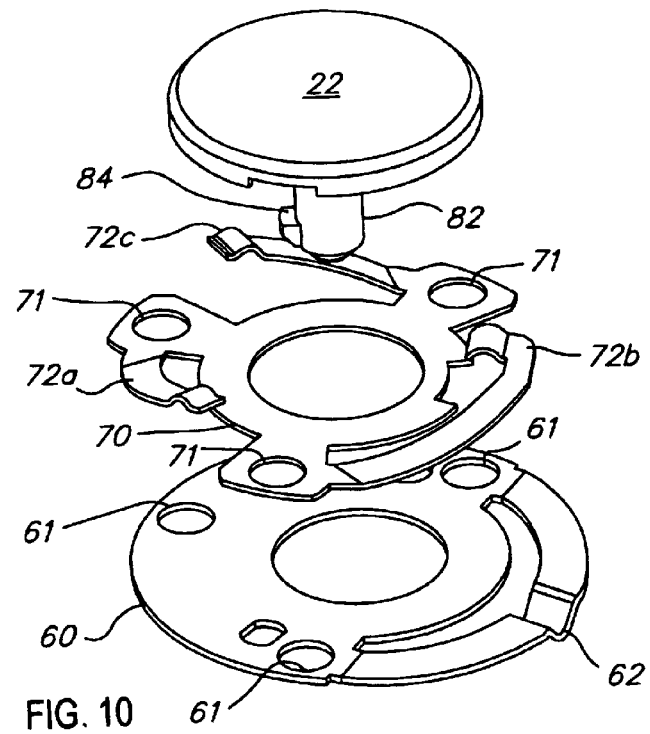
Figure 11:
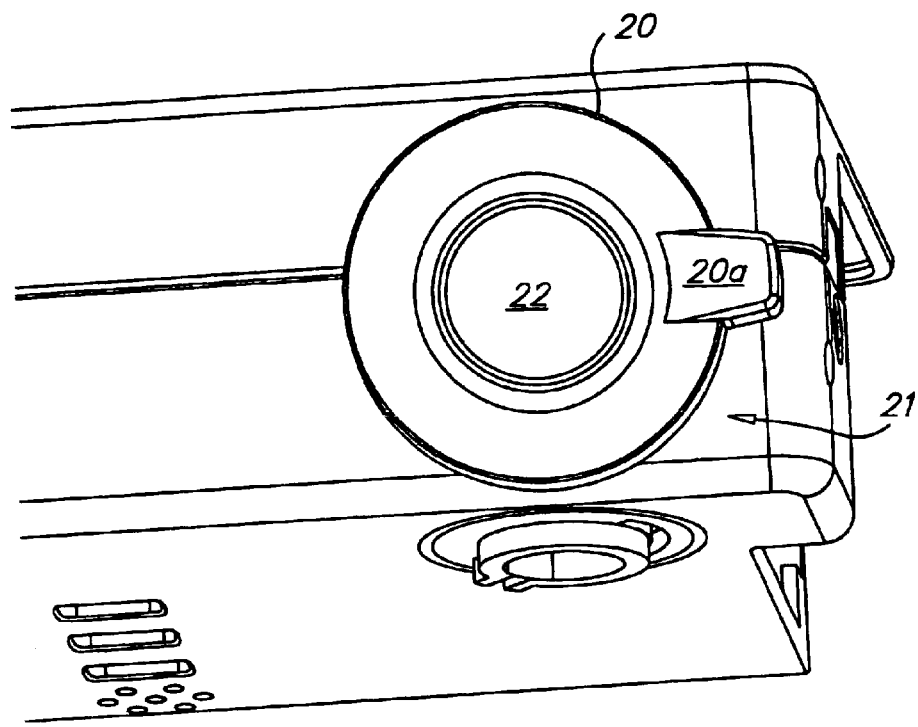
Figure 12:
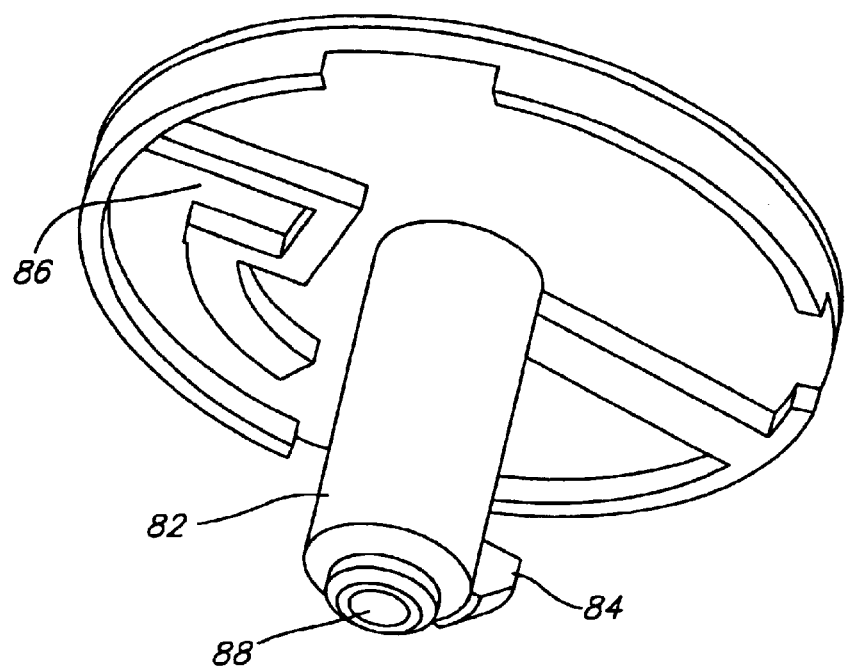
Figure 13A:
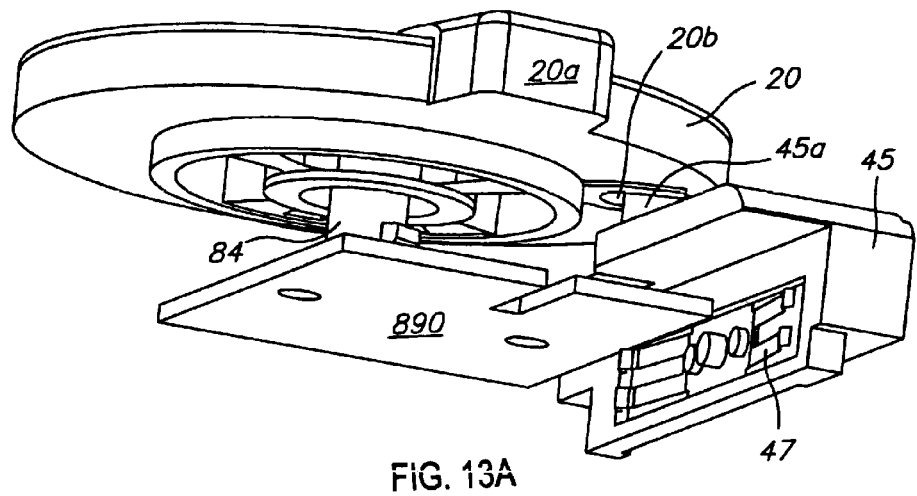
Figure 13B:
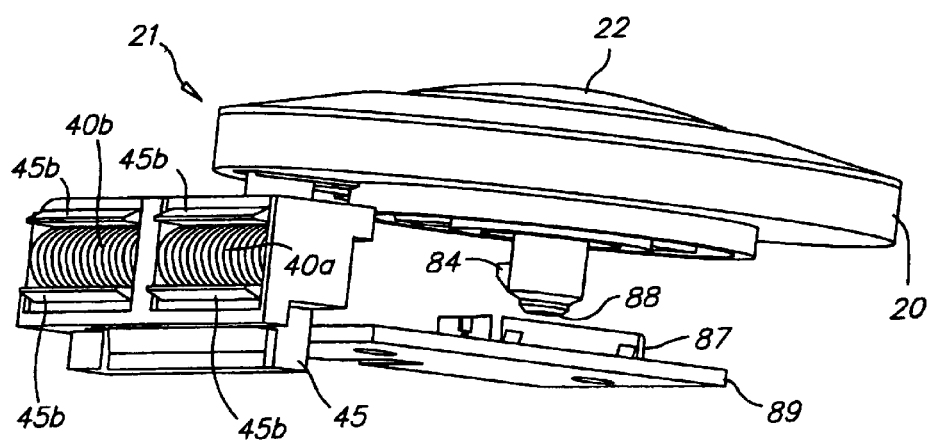
Figure 14:
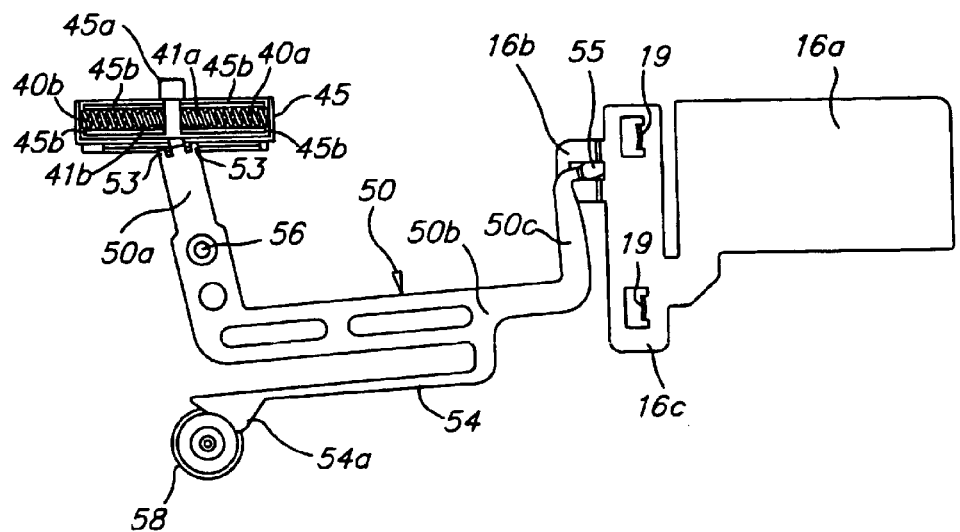
Figure 15:
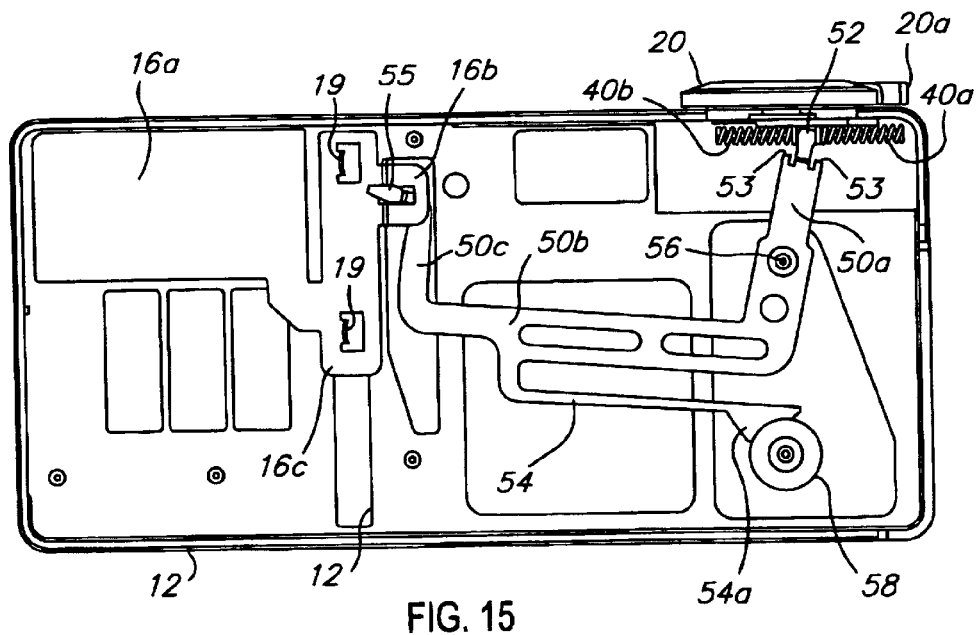
Figure 16:
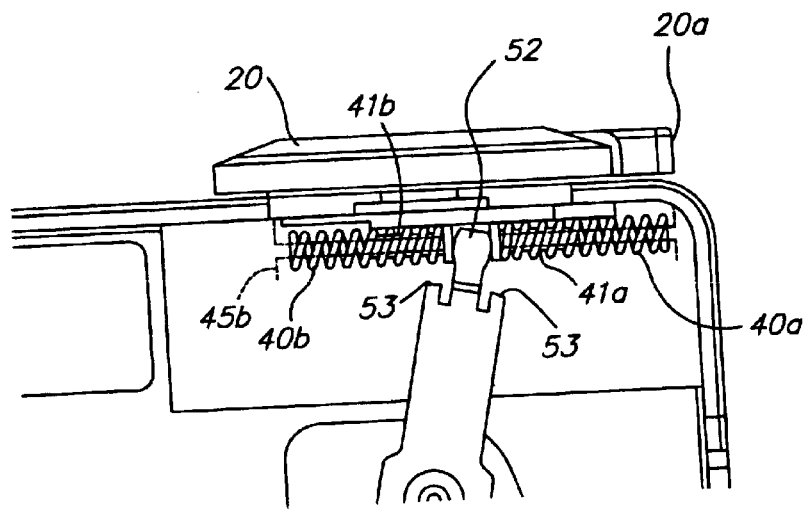
Figure 17:
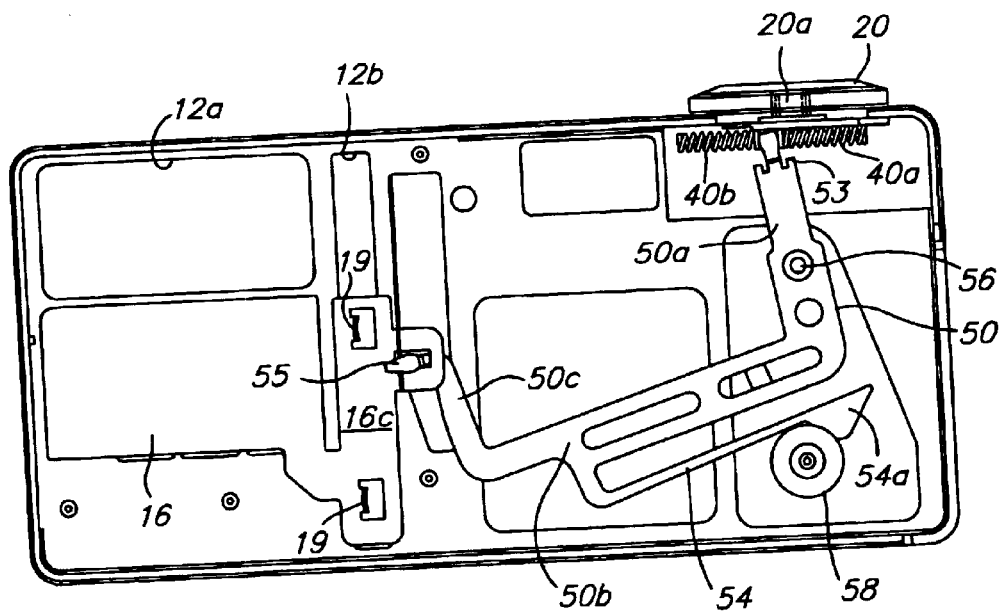

Referring now to FIG. 9, sitting on top of the on/off detent spring 60 is a release button spring 70, which acts as additional capturing support for the release button 22 and on/off switch gear 20, as well as provides the vertical spring force to the release button 22. In one preferred embodiment, both flat springs 60 and 70 are being held down by screws 74, although other pins or heat stake elements would work as well. The screws or pins are secured to the three posts 12e formed on the top face 11 of the front housing 12.

The release button spring 70 includes three leaf spring legs 72a, 72b and 72c. The leaf spring legs 72a, 72b and 72c extend upward from the plane containing the detent spring, within the rotary on/off switch gear 20. The upper surfaces of the leaf spring legs 72a, 72b and 72c contact the release button 22, when installed and return the release button 22 to its normal position after the consumer has depressed the button 22, when capturing an image. As with the on/off detent spring 60, the release button spring 70 includes three screw openings 71 aligned with the openings 61 of the on/off detent spring 60 so that the screws 74 pass through and secure the release button spring 70 to the top surface 11 and so that the release button spring resists rotational forces when the rotary on/off switch gear 20 is turned.

Referring now to FIGS. 9–13b, there is shown is shown a self-locking camera release button assembly. The release button 22 includes a shaft 82 and a key 84. The shaft 82 and key 84 fit into the opening 12c in the post 12d, with the key 84 fitting through the rectangular key slot 12f. By turning the release button 22 clockwise, the release button is held downwards by interconnection of the upper key surface to the lower front shell hole surface. Turning the release button 22 further, one release spring leg 72b of the release button spring 70 will interlock with a track 86 on the lower surface of the release button 22. The release button 22 is now permanently captured in the vertical direction and is protected against movement in the rotational direction. The three leaf spring legs 72a, 72b and 72c of the release button spring 70 will push the button upwards. The lowest surface 88 of the release button shaft 84 will push against and activate a tactile switch 87 on the PCB 89 or other switch device. As such, once the release button 22 shaft 84 is inserted through the bearing surface 12d and is rotated clockwise with the key 84 no longer aligned with the key slot 12f and the leaf spring 72b is trapped in the track 86, the release button 22 is locked into the housing without the need for a "c" ring and corresponding groove on the stem 84.

The Rotary to Linear Door Linkage Mechanism

One particular embodiment of the door opening mechanism will now be described in connection with FIGS. 13a–17. The door opening mechanism of the present embodiment translates the rotary motion of the rotary on/off switch gear 20 to the linear up/down motion of the lens door 16. As described above, the door controller 45 is engaged with the rotary on/off switch gear 20 via the door control pin 45a. To secure the open and closed end positions of the lens door 16, a spring biased lever is used.

A lever 50 is attached between the door controller 45 and the lens door 16 by means of a series of bends on the lever 50 and the door 16. More specifically, a finger 52 of lever 50 is connected to body portion 50a of the lever 50 at a bend portion. Similarly, the finger 55 is connected to an arm portion 50c of the lever 50 by a bend portion. The lens door loop 26b has a corresponding bend to facilitate mating with the finger 55. Two other bends 19 of the lens door slide portion 16c interact with the lens door mask (not shown) and build a guide rail mechanism for the up and down motion of the lens door 16.

The present door lever mechanism has an incorporated spring arm 54, which is part of the lens door lever 50. During lens door motion, a wedge portion 54a of the spring arm 54 moves over a roller to reach two different end positions and provide an "over the center" approach to ensuring two discrete opened and closed positions of the lens door 16. Spring portion 54 is attached to lever body portion 50b.

The pre-load of the spring portion 54 (linked through the bends on the lens door and the activation lever by the two end positions of the spring) secures the open and closed positions of the lens door 16. The lens door lever 50 has a bearing connection through a pin 56 of the lens door that is captured by a thin washer. As such, the door lever 50 pivots around the pin 56 in response to motion of the finger 52, connector 45 and rotary switch gear 20. The pivoting of the lever 50 serves to slide the ribs 19 in the guide track and open or closed the lens door 16. Ribs 19 may be formed in or punched from the guide portion 16c, or may comprise another material affixed to the guide portion 16c. The spring wedge 54a passing over the roller from one side to the takes over the opening or closing of the door after the initial turn of the rotary switch gear 20. The lens door 16 is fixed open or closed depending upon which side of the roller 58 the wedge 54a stops.

The present particular embodiments shown in FIGS. 15–18 are additionally shown including a damage protection mechanism to prevent the lens door 16, the door lever 50, 90 or the switch connector 45, from being damaged if the lens door 16 is manually forced open by the user. Located within two opposite slots of the lens door connector 45 are two lens door guide pins 41a and 41b located coaxially within the springs 40a and 40b. The guide pins 41a and 41b and springs 40a and 40b are maintained in place in the slots of the connector 45 by two side walls 45b which are heat staked to the connector 45. The rounded lens door lever finger 52 engages the connector 45 between the two lens door guide pins 41a and 41b. Interacting with the bottom surface of the lens door connector 45 on the lens door lever 50 are two radial shaped fingers 53, which are locked into position by the bent surface adjacent the finger 52 formed on the lens door lever 50. The rounded surface portions of the fingers 53 help to guide the lens door connector 45 towards the front lens door surface 16a.

The door springs 40a and 40b and guide pins 41a and 41b in combination act as a lens door part damage prevention device. In event that the lens door is being forced open, the springs 40a and 40b would retract and allow the lens door lever 50 and lens door 16 to move freely. This damage prevention would also act similar if the lens door knob 45a were rotated (clockwise or counter clockwise) while the lens door was being opened or closed by force.

Figure 18:
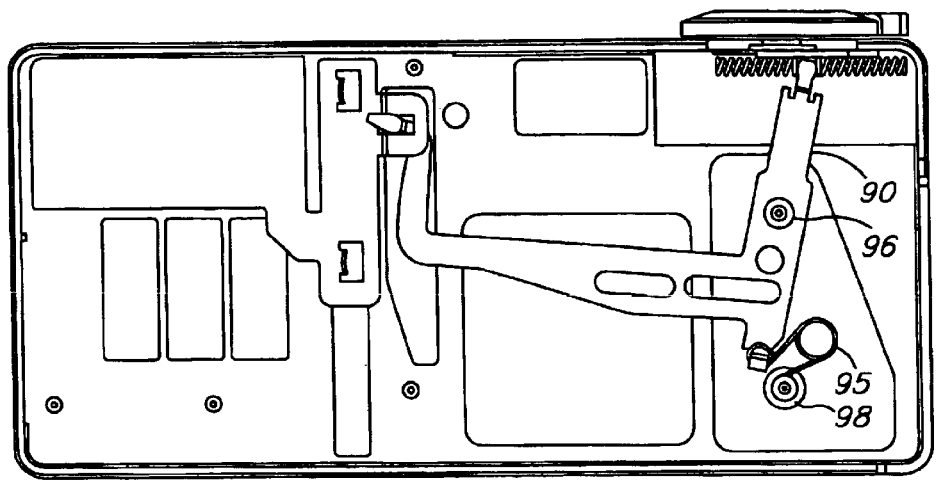
Figure 19:
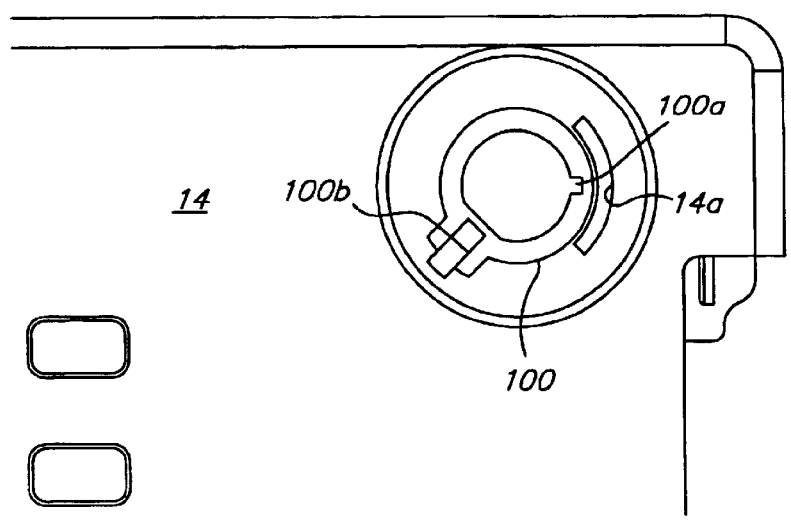
Figure 20:
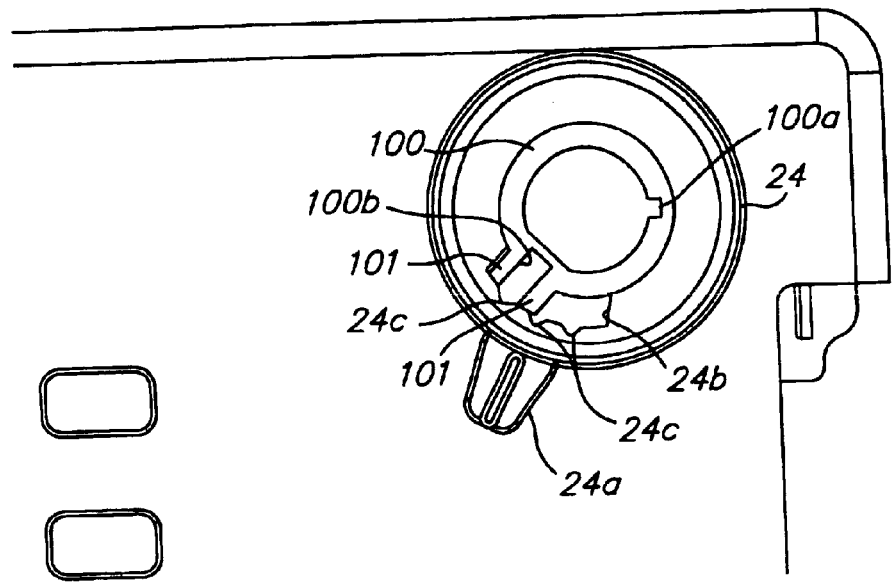
Figure 21:
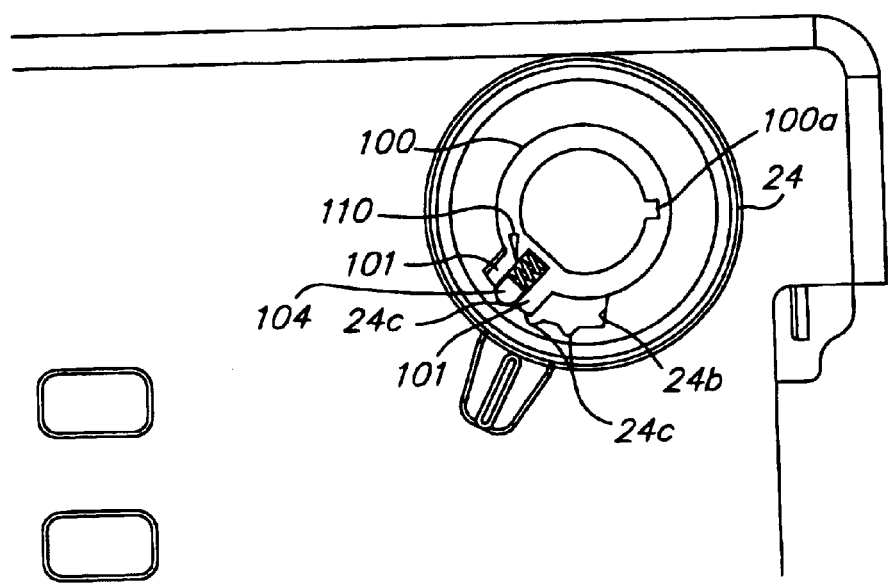

Referring now to FIG. 18, there is shown an alternate embodiment of the rotary to linear door linkage mechanism using an omega type spring 95 to accomplish the two discrete positions of the door lens 16. Whereas the remainder of the parts are essentially the same as described in connection with FIG. 15, the lever 90 differs from the lever 50 such that the lever 90 does not include an integral spring portion. Rather a spring 95 with two end loops, similar to an omega spring function, interacts between a pin 92 on the front cover and a hook 97 on the lens door lever 90. When the gear 20 is rotated to the "on" position, the lever 90 and spring 95 are rotated, biasing the door 16 into the open position as described above in connection with the embodiment of FIG. 15. When the switch gear 20 is rotated back to the initial position, the lever 90 is rotated, rotating the spring and biasing the door into the closed position. The present embodiment could be adapted to use other types of springs, such as a hooked coil spring, a torsion spring, etc.

The Direct Rotary to Linear Mode Switch with Spring Loaded Detent Mechanism

Referring now to FIGS. 4, 5, and 19–22, there is shown a rotary mode switch assembly 23. In the present particular embodiment, the rotary mode switch assembly 23 includes the rotary to linear mode switch gear 24 and the nested 5 position joystick 26. It can be seen that the 5-position joystick 26 may be omitted with out materially changing the present embodiment.

The rotary mode switch assembly 23 is mounted to and through the back housing 14 of the image capture device 10. As can be seen more particularly in FIGS. 5 and 19, the outer surface of the rear housing 14 includes a bearing surface 100 formed thereon. A window 14a is formed through the rear housing 14, around an arcuate portion of the periphery of the bearing surface 100. Additionally, the bearing surface 100 includes an alignment notch 100a and a channel 100b formed therein.

Figure 22:
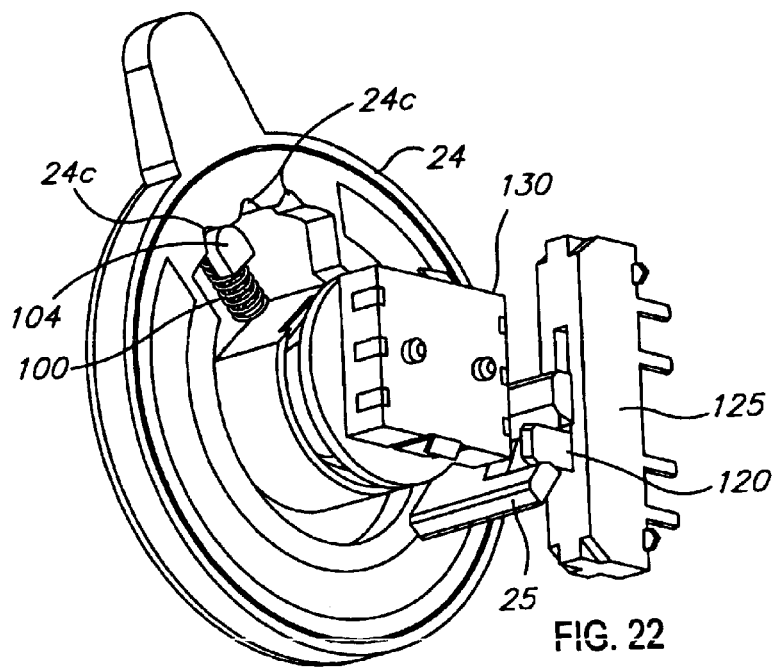
Figure 23:
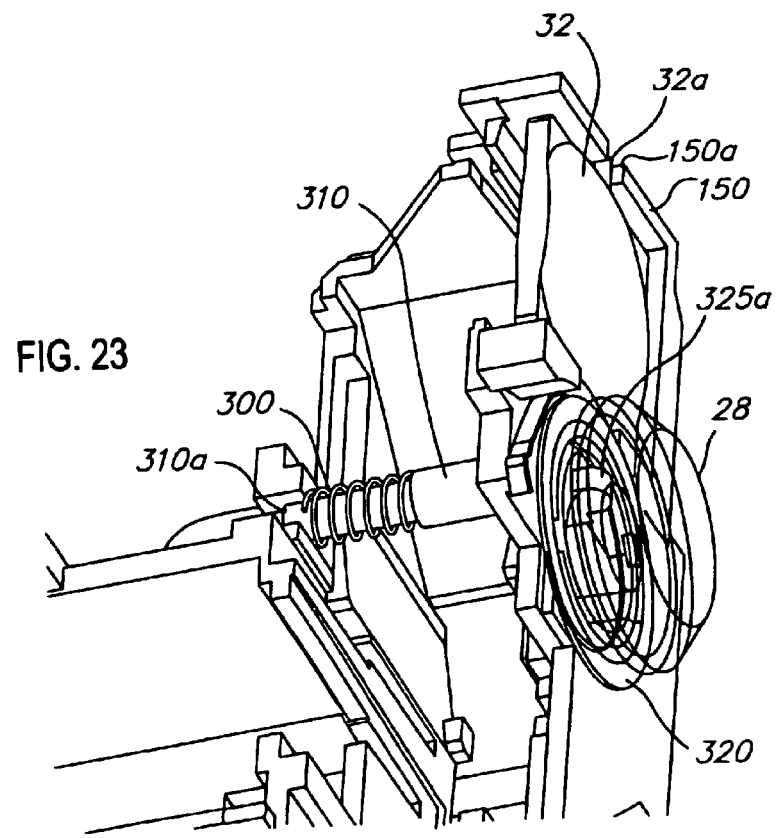
Figure 24:
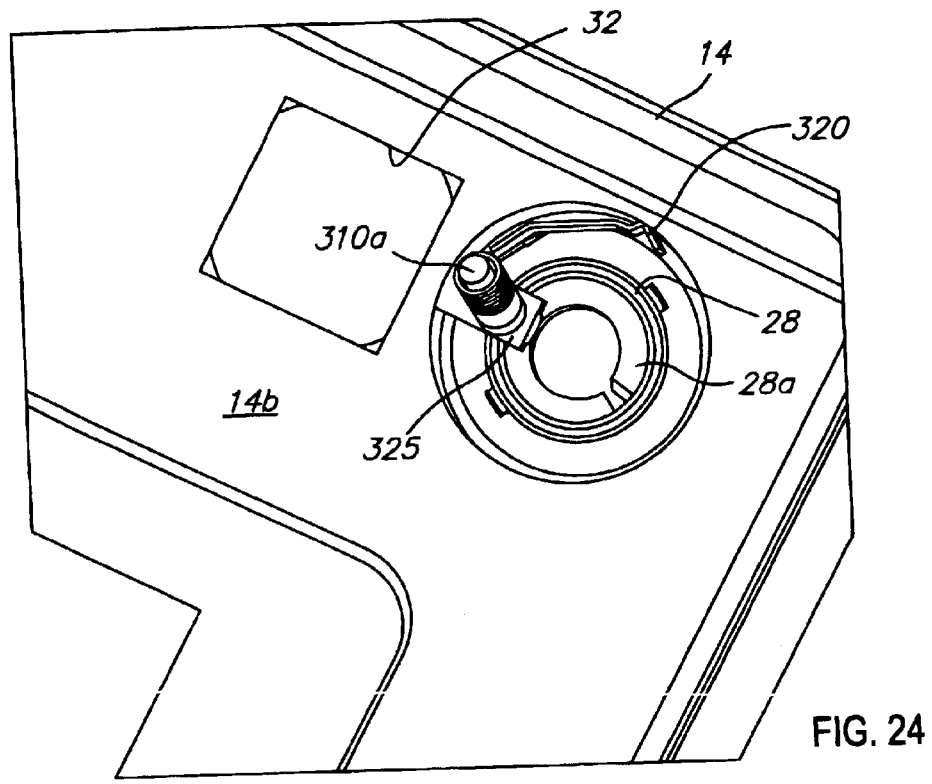
Figure 25:
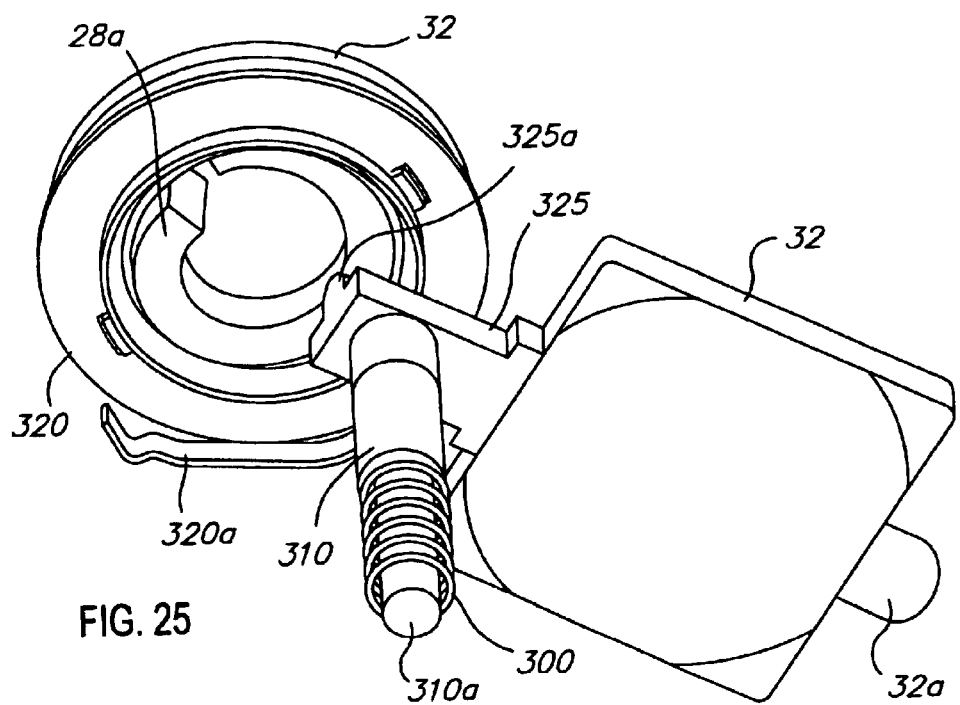

A rotary mode switch gear 24, having a switch position tab 24a surrounds the bearing surface 100. The inner circumference of switch gear 24 includes an open portion 24b sized to accommodate the walls of channel 100b and permit the gear 24 to be rotated to different switch positions. In the present embodiment, three switch positions are described, although fewer or greater numbers of positions may be chosen. The outer circumferential wall of the open portion 24b includes a number of detent position notches 24c corresponding to a plurality of different possible discrete switch positions, in order to stop the rotation of the switch gear 24 at a plurality of distinct detent positions. Additionally, the back face of the switch gear 24 includes a projection 25 (FIG. 22). The projection 25 is sized to pass through the window 14a when the gear 24 is placed on the bearing surface 100 with the chamber walls 101 placed in the opening 24b. The projection 25 is adapted to grip the actuator 120 of a linear switch 125, as shown in FIG. 22. The linear switch 125 is mounted on a PCB (not shown) in the image capture device 10. The number of discrete detent positions of the switch gear 24 should correspond to the number of switch positions used on the linear switch 125.

Further, a spring loaded detent assembly 110 is loaded into the chamber 100b after the switch gear 24 is engaged with the bearing surface 100 and placed flush with the rear housing 14. The spring loaded detent assembly 110 includes the loaf shaped detent cap 104 (see FIG. 22) and the spring 102. Spring 102, which engages a bearing surface at the rear of the loaf shaped detent cap 104, additionally contacts the back wall of the channel 100b to bias the rounded portion of the loaf shaped detent cap into the discrete detent position notches 24c. Note that in the present embodiment the loaf shaped detent cap includes a hollow portion to accept one free end of the spring 102 therein in order to stabilize the spring 102. The rounded top surface of the loaf shaped detent cap is oriented to provide a maximum amount of surface area contact with the inner surface of the detent notches 20c for a stable and secure fit. Although the loaf shaped cap 104 is preferred, it can be seen that other shaped detent caps (i.e. bullet shaped, ball shaped) may also be used.

As can be seen, rotation of the switch gear 24 causes the spring 102 to compress as the rounded portion of the loaf shaped detent cap 102 leaves the notch 24c and decompress as the rounded portion enters the next notch 24c. Simultaneously, the projection 25 rotates and moves the actuator 120 linearly to the next switch position. As such, rotary motion of the mode switch gear 24 is translated directly into linear motion of the linear switch actuator 120.

Note that a five-position joystick switch is passed through the opening at the center of the bearing surface 100 and connected to a tactile switch 130 mounted on a PCB (not shown). The five position switch is locked into place using key slot 100a of the bearing surface 100. The rotary mode switch may be used for any desired purpose, such as to change the camera mode between the image capture and image viewing modes, as well as other modes. In the present embodiment, the five-position joystick is used to scroll between and choose options on the user interface, as well as to operate the physical zoom and digital zooms between the tele and wide positions.

The Zoom Lens System

Figure 26:
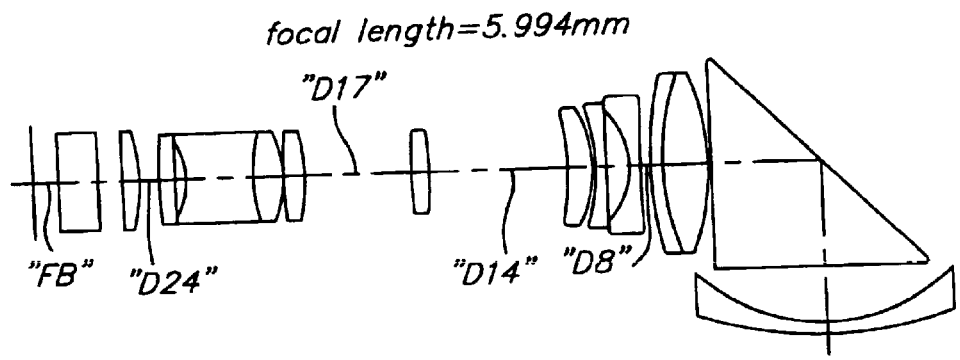
Figure 27:
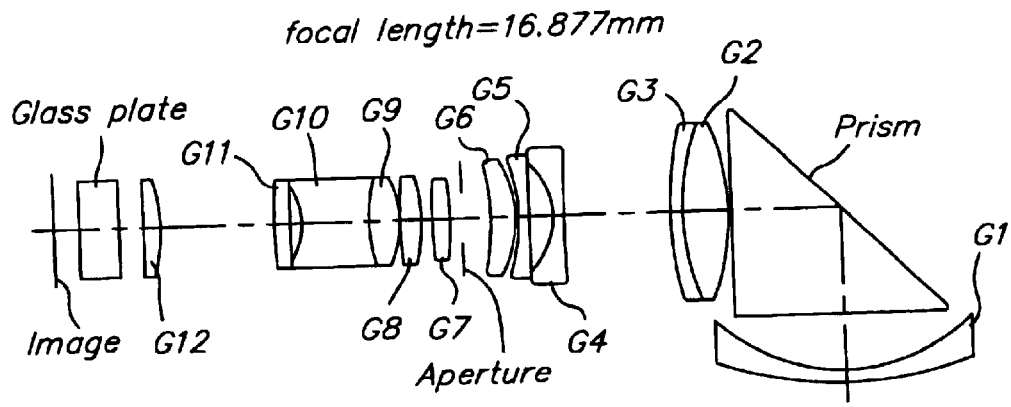
Figure 28:
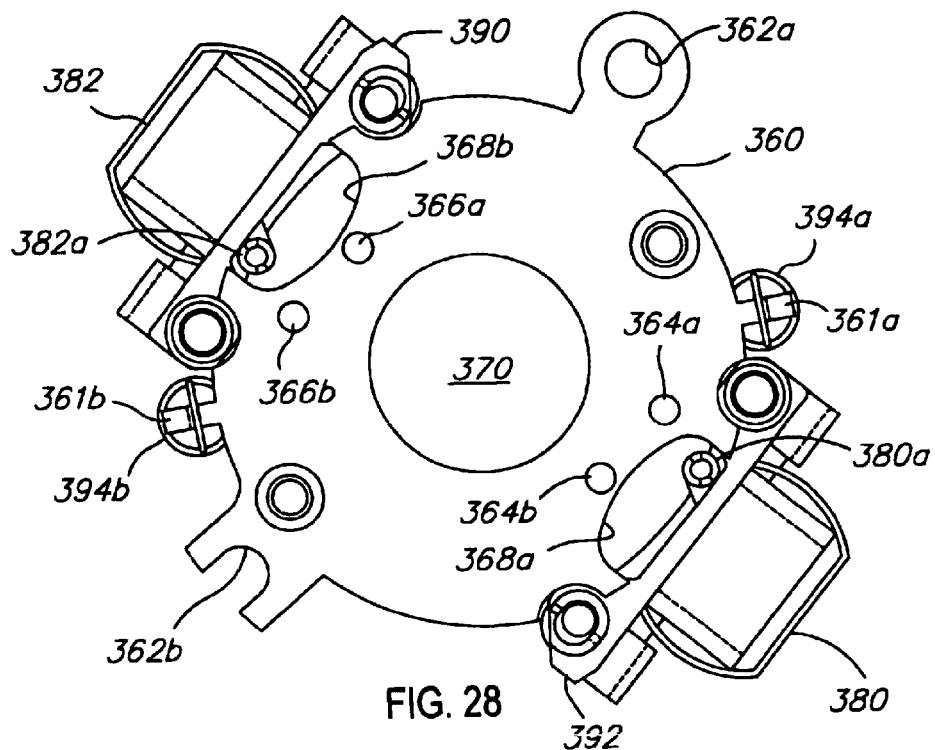
Figure 29:
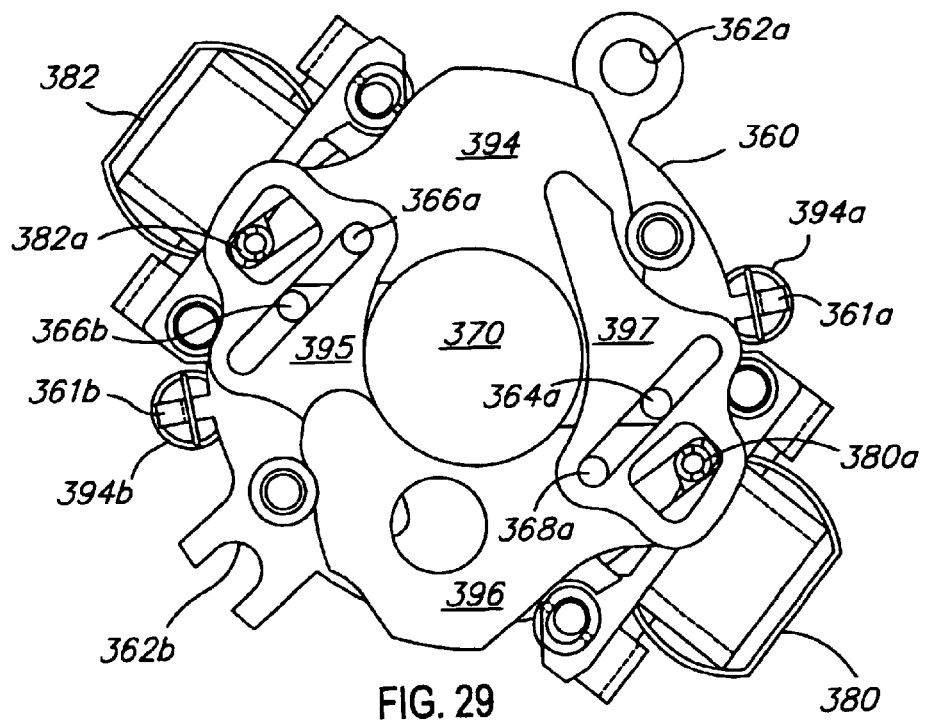

One particular arrangement of lenses and prisms for making a compact zoom lens for an image capture device, such as image capture device 10, is shown in FIGS. 26 and 27, and defined by the following tables read in connection with the FIGS. 26 and 27:

TABLE 1

3x zoom lens
Curvature list for all lens elements

| Lens | Radius (mm) | Shape | Thickness (mm) | Effective Diameter (mm) | Material |
|------|-------------|-------|----------------|-------------------------|----------|
| G1 | 33.132 | CX | 1.00 | 23.4 | LaK4 |
|    | 15.040 | CC |      | 20.5 |      |
| G2 | 21.000 | CX | 3.55 | 13.4 | ZK14 |
|    | 21.000 | CX |      | 12.8 |      |
| G3 | 21.000 | CC | 0.85 | 12.8 | ZF17 |
|    | 32.576 | CX |      | 12.5 |      |
| G4 | 134.728 | CC | 0.80 | 10.1 | ZK21 |
|    | 6.610 | CC |      | 8.5 |      |
| G5 | 176.087 | CC | 0.80 | 8.4 | ZK14 |
|    | 14.350 | CC |      | 8.3 |      |
| G6 | 9.670 | CX | 1.99 | 8.4 | SFL6 |
|    | 23.000 | CC |      | 8.0 |      |
| G7 | 33.532 | CX | 1.10 | 5.5 | QK3 |
|    | 101.092 | CX |      | 5.6 |      |
| G8 | 16.650 | CX | 1.60 | 6.2 | ZK21 |
|    | 30.200 | CX |      | 6.3 |      |
| G9 | 8.878 | CX | 2.31 | 6.4 | E-FL6 |
|    | 14.837 | CX |      | 6.1 |      |
| G10 | 14.837 | CC | 5.29 | 6.1 | ZF12 |
|    | 5.900 | CC |      | 5.2 |      |
| G11 | 55.720 | CX | 1.32 | 5.3 | QK3 |
|    | 24.660 | CX |      | 5.6 |      |
| G12 | 14.950 | CX | 1.33 | 7.0 | LaSF016 |
|    | 63.450 | CC |      | 7.0 |      |

TABLE 2

Lens spacing in 9 steps zoom range

| Focal length | FB | D8 | D14 | D17 | D24 |
|--------------|-----|-----|------|------|------|
| 5.994 | 2.118 | 1.004 | 10.118 | 8.494 | 1.671 |
| 6.569 | 2.115 | 1.956 | 9.166 | 8.021 | 2.147 |
| 7.240 | 2.111 | 2.908 | 8.214 | 7.490 | 2.682 |
| 8.034 | 2.108 | 3.860 | 7.262 | 6.886 | 3.289 |
| 8.988 | 2.104 | 4.811 | 6.310 | 6.188 | 3.991 |
| 10.159 | 2.104 | 5.763 | 5.359 | 5.364 | 4.815 |
| 11.651 | 2.104 | 6.715 | 4.407 | 4.348 | 5.831 |
| 13.674 | 2.104 | 7.667 | 3.455 | 3.007 | 7.173 |
| 16.877 | 2.104 | 8.618 | 2.504 | 0.898 | 9.282 |

FIGS. 26 and 27 show the zoom lens layout of one particular embodiment in two position, which are f=5.994 mm and f=16.877 mm. In the diagram, lenses G4, G5 and G6 are the moving groups comprising the front group. Lenses G8, G9, G10 and G11 are another moving group comprising the rear group. Front and rear groups will be moved together as per zoom table to get different zoom ranges. The other elements except G12 are always in fixed location. Lens G12 will be moved by a focusing motor (not shown) for focusing purposes.

The Zoom Mechanism

The image capture device 10 may include a zoom mechanism. One particular embodiment of a zoom mechanism that may be used with the image capture device 10 will now be described in connection with FIGS. 37–46. Housed in a zoom housing 450 are the two zoom barrels, front barrel 460 and rear barrel 470. Aligned on the optical axis through the front and rear barrels 460, 470 is an image sensor 475. Other elements including the shutter lens 370 (G7 of FIG. 27), a focusing lens 455 (G12 of FIG. 27) and a glass plate 476 are additionally included within the zoom housing 450.

Figure 40:
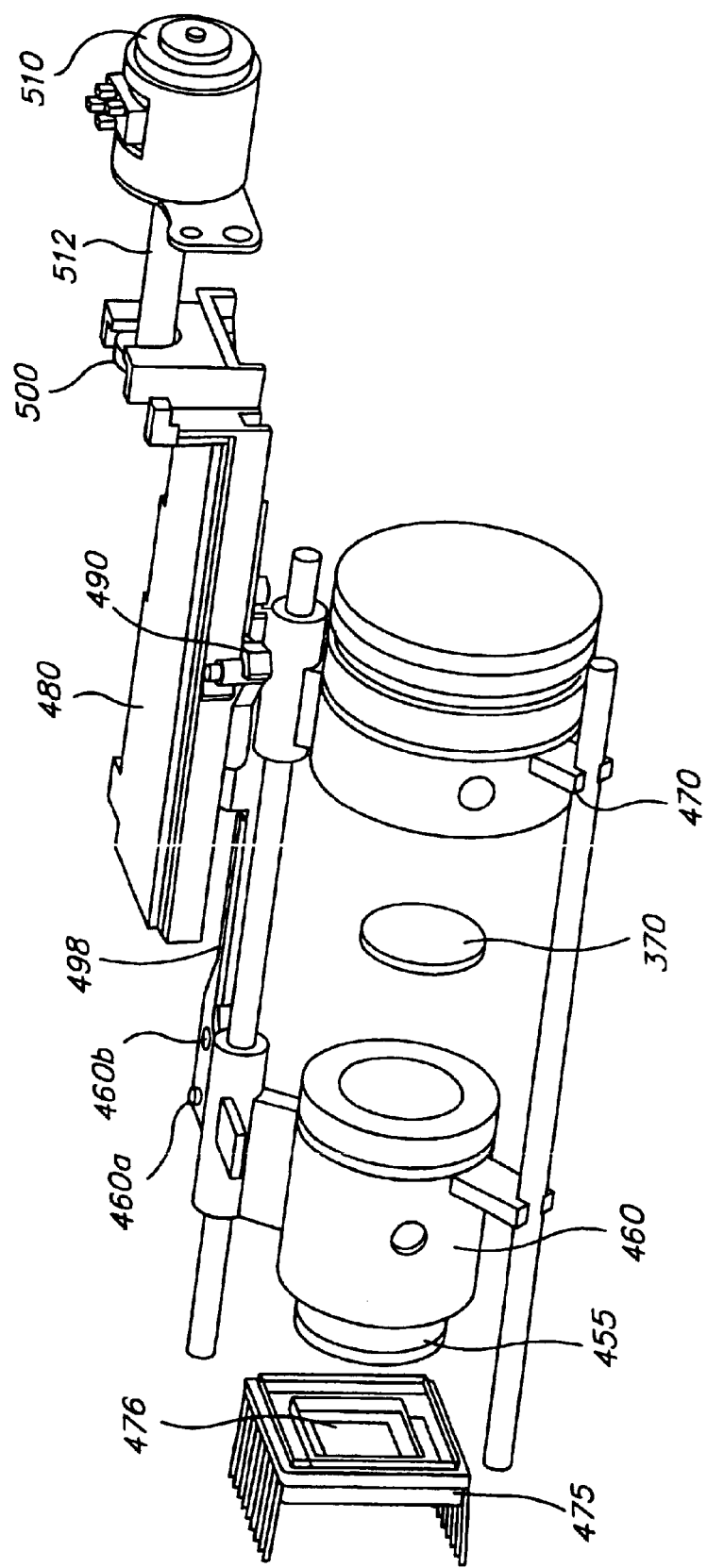
Figure 41:
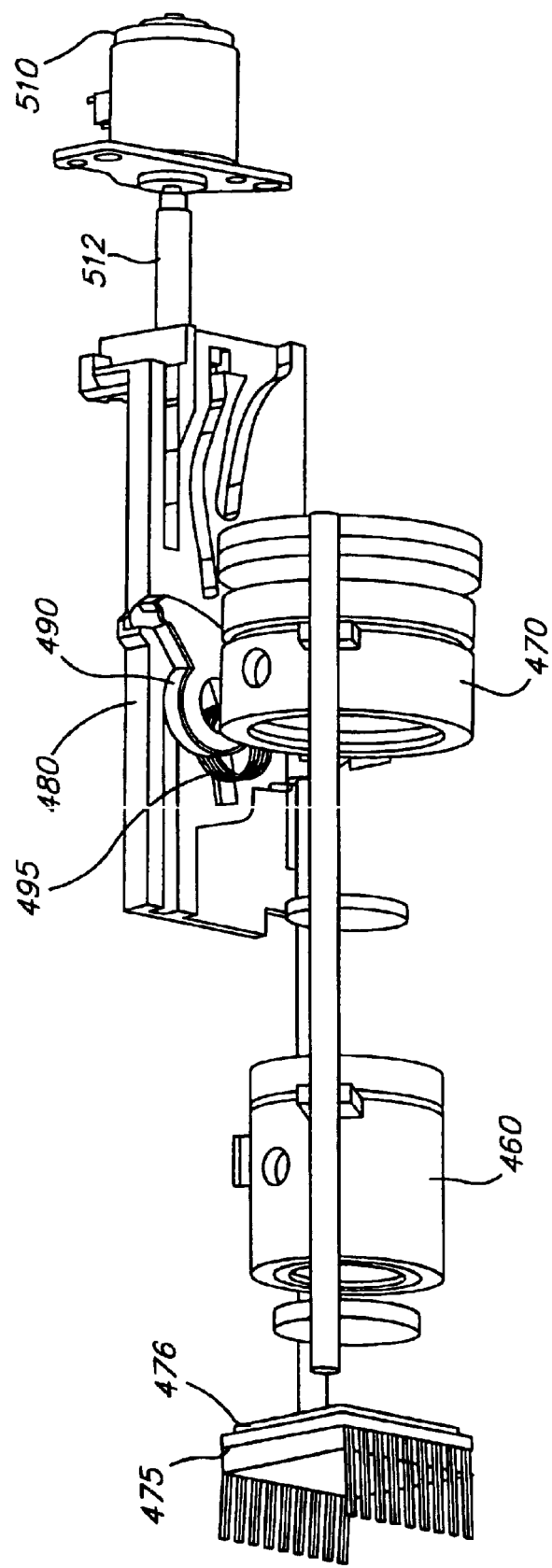
Figure 42:
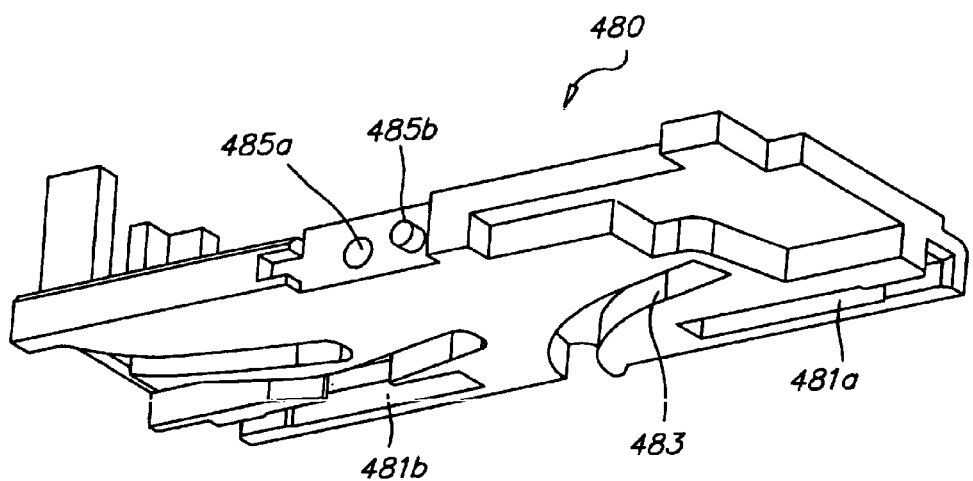
Figure 43:
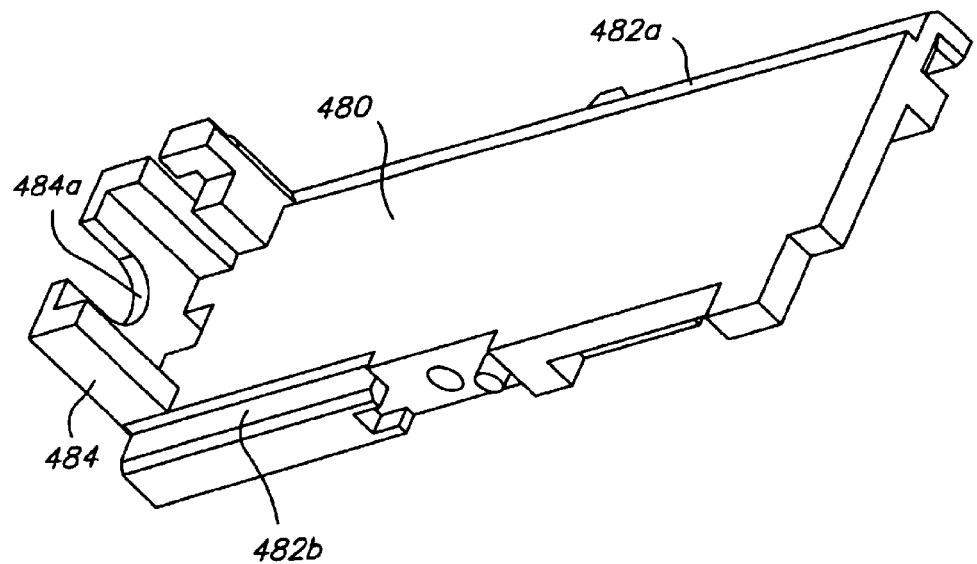
Figure 44:
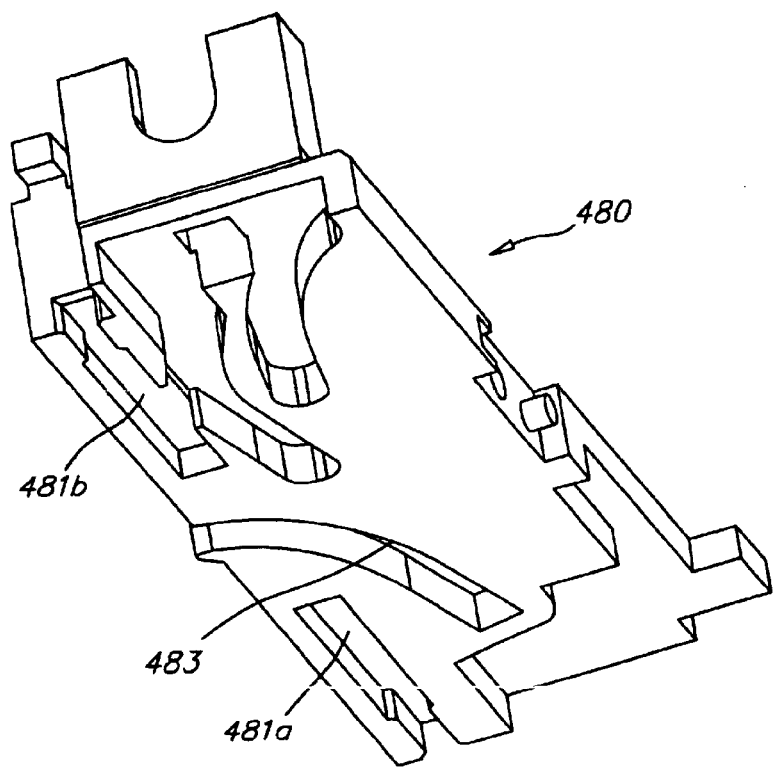
Figure 45:
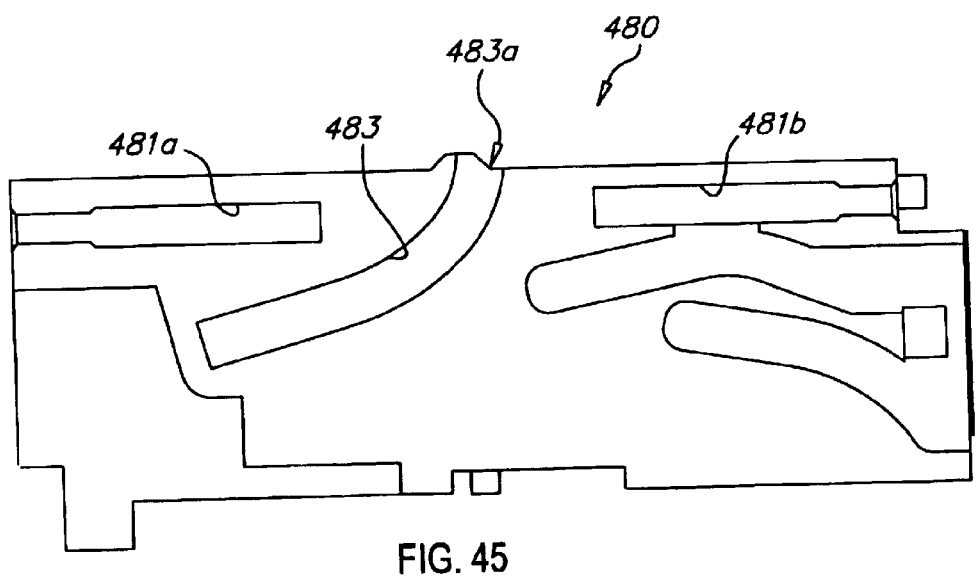
Figure 46:
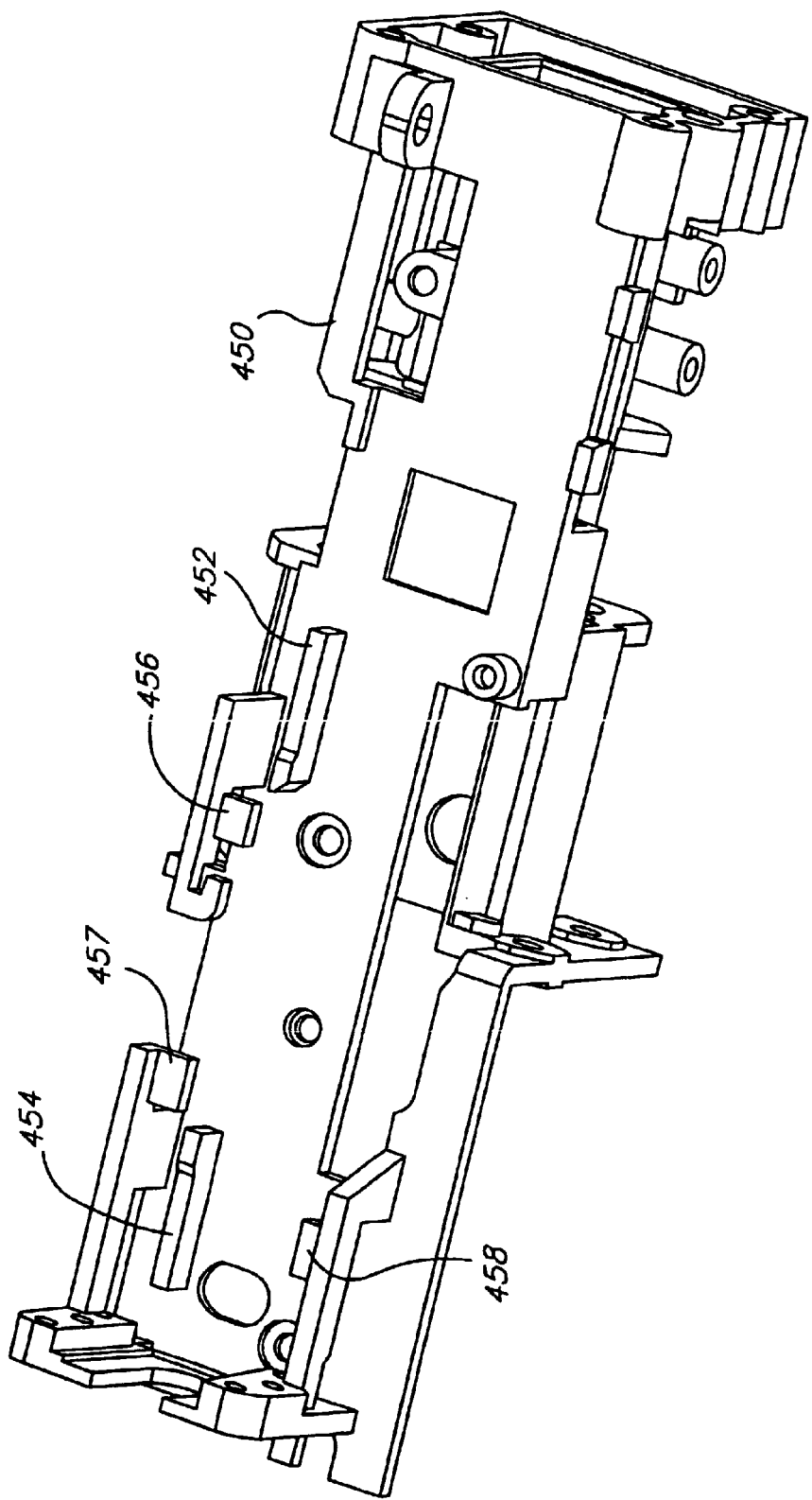
Figure 47:
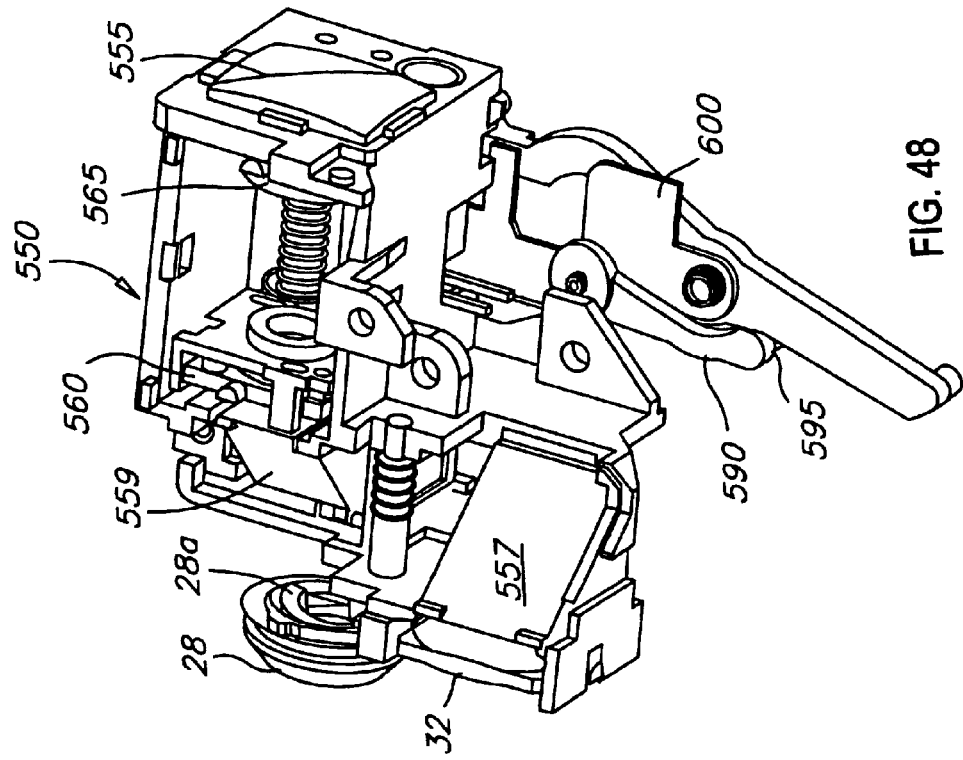
Figure 48:
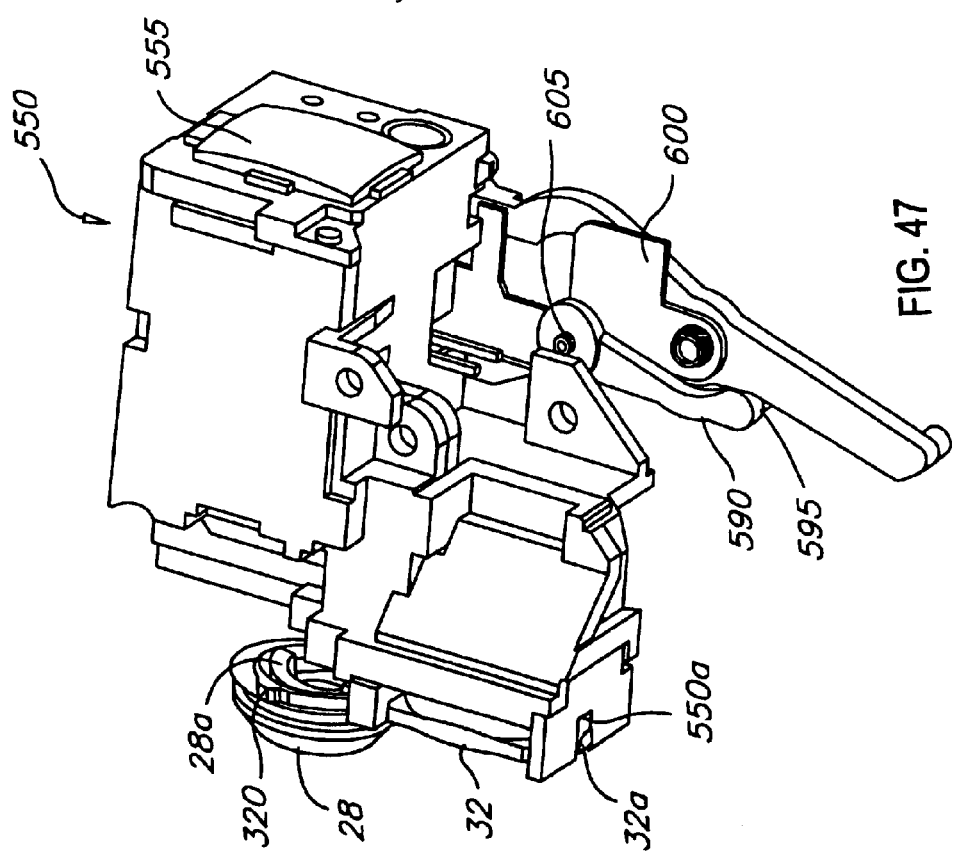
Figure 50:
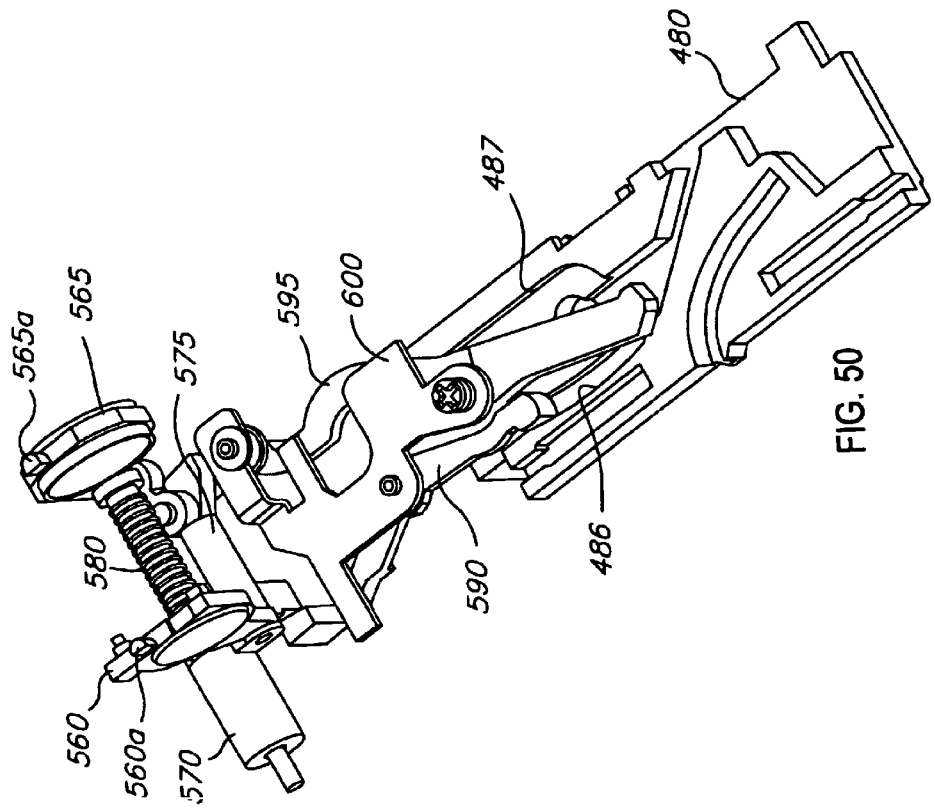
Figure 49:
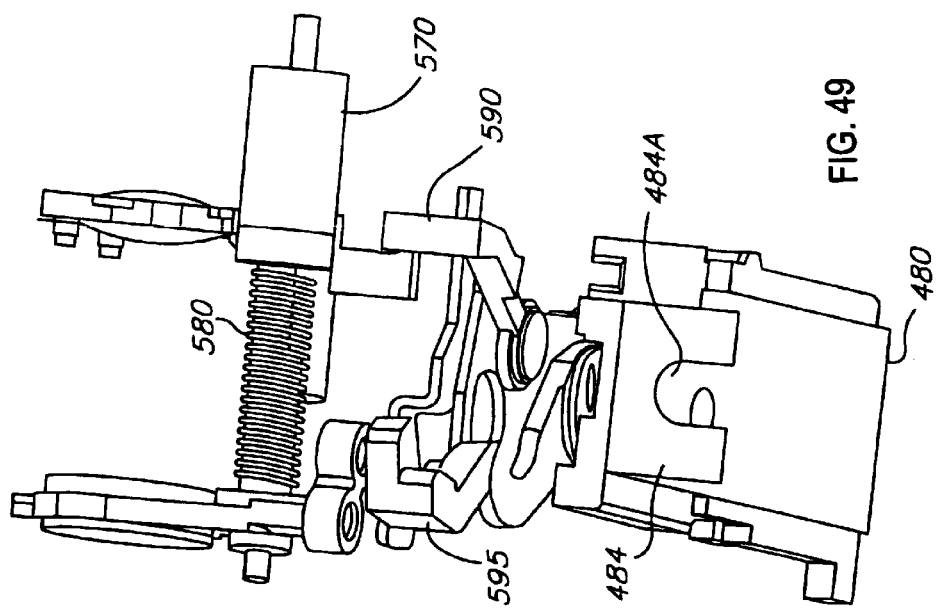
Figure 52:
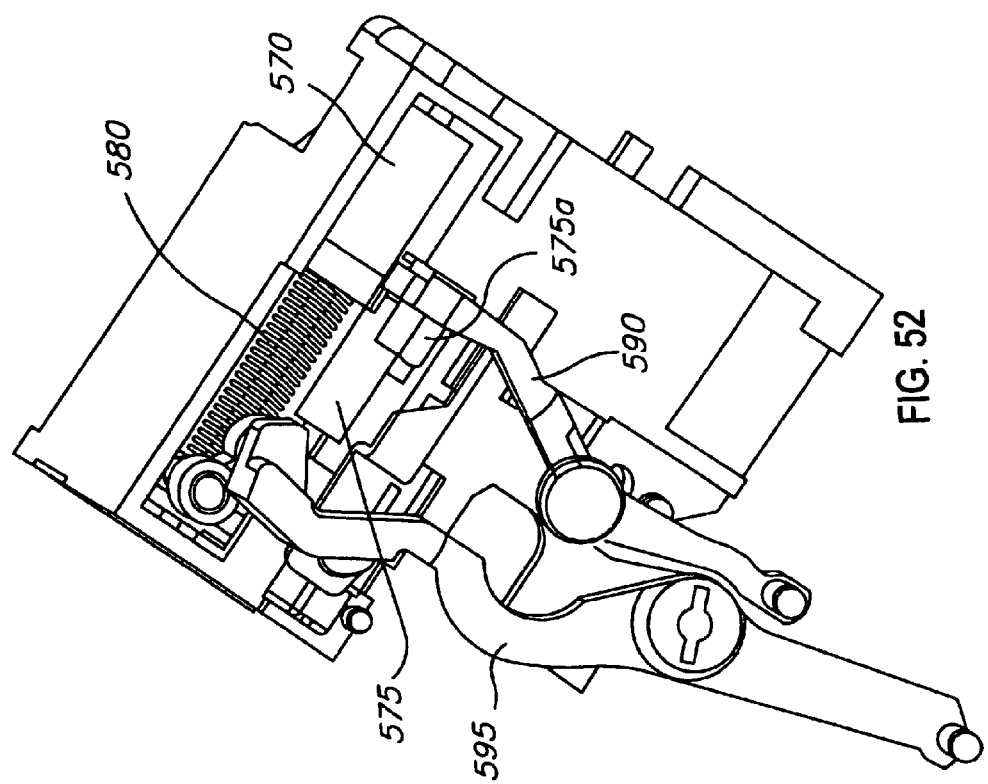
Figure 51:
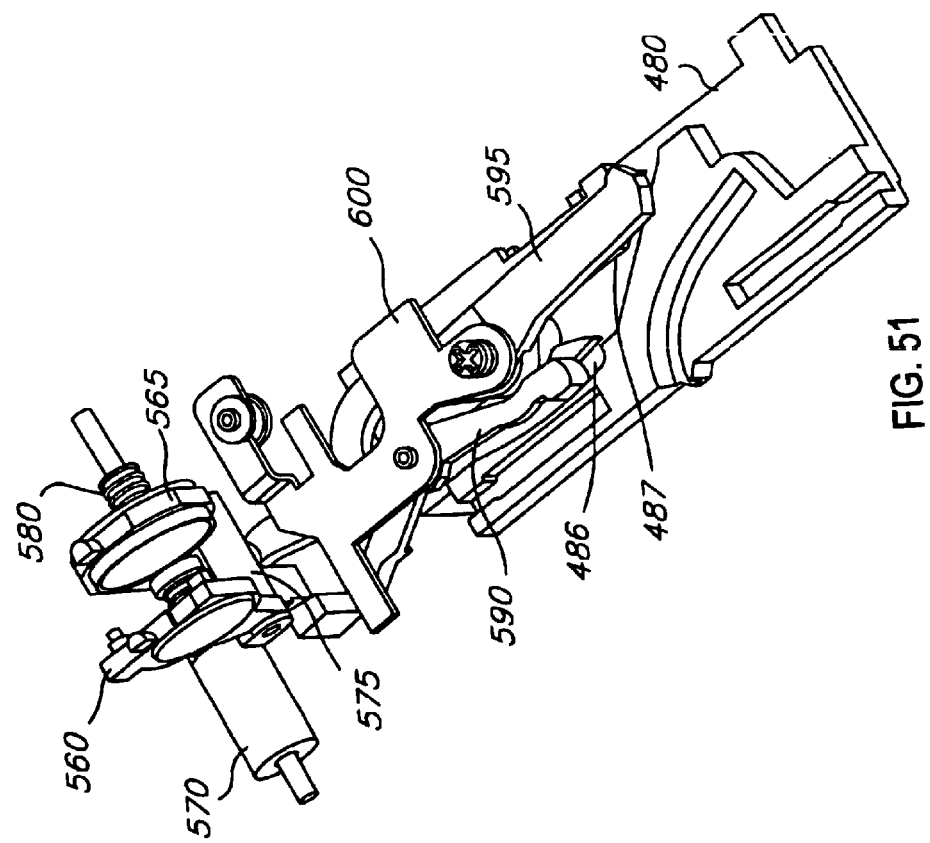
Figure 53:
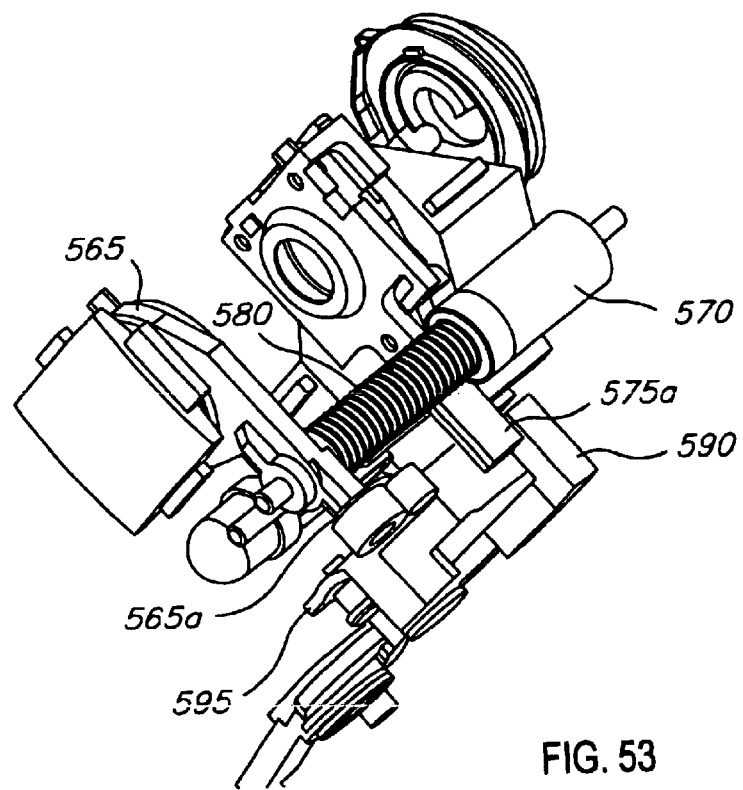

The distance between the front barrel 460 and the rear barrel 470 determines the magnification factor of the image between the wide angle (FIGS. 38 and 39) and the telephoto positions (FIGS. 40 and 41). In the present particular embodiment, a linear cam flat 480 controls the zooming of the image capture device 10 by locating the front and rear lens barrels 460, 470 at discrete positions, each with the barrels 460, 470 a predetermined distance apart.

The cam flat 480 is directly coupled with one barrel (in the present embodiment, the front barrel 460) of the zoom lens via the zoom coupling linkage 498 and is coupled to the other barrel 460 by a zoom lever 490. The cam flat 480 is located on and guided by the zoom housing 450. Guides are realized on the zoom housing 450 by two straight ribs 452, 454 and counter surfaces 456, 457, 458 on the zoom housing 450. These ribs 452, 454 and counter surfaces 456, 457, 458 define the position of the cam in two directions and permit only linear motion. For example, the ribs 452, 454 interact with linear grooves 481a and 481b defined on the bottom surface of the cam flat 480. If desired, tracks, such as tracks 482a and 482b, may additionally be defined on the cam flat 480 to interact with the counter surfaces 456, 457, 458. Due to the counter surfaces 456, 457, 458 contact with the surface, the zoom housing provides a 3 point guide for the cam flat 450. Three small areas near these points but in opposite directions serve the same function. This permits the cam flat 480 to operate even if there is a slight deflection or if there is variation to the tolerances during manufacture, but without a loss of performance.

Additionally, misalignment of the straight ribs 452 and 454 would create high friction or prevent free movement of the cam flat 480. This is avoided by reducing the guide lengths 481a, 481b inside the cam flat 480 to a minimum. Therefore an additional deflection of the cam flat 480 and/or misalignment of the straight ribs 452, 454 will not deteriorate the guide quality.

The non-proportional movement of the zoom lever 490 is realized by the cam profile 482 inside the cam flat 480, which generates the relative positions of both barrels as defined by an optical calculation, the results of which are reported in Table 2 above for a nine position zoom lens mechanism. The integral cam profile 482 that the lever 490 follows, is optimized in order to have the lever 490, and correspondingly the lenses, follow a particular optical prescription which incorporates a non-proportional motion.

A spring 495 (chosen to be a torsion spring in the present embodiment) is supported on the zoom housing 450 by a pin 450a and presses a finger 471 on the rear barrel 470 against the zoom lever 490, which in turn leans on the inner side of the cam profile 482 to make it follow the prescribed path when the cam flat 480 is moving. A second supporting spring 496 (FIG. 41), which in this particular embodiment, has also been chosen to be a torsion spring, is used to generate an additional force on the cam flat 480. The reason for this spring 496 in this embodiment is to ensure that the cam flat 480 is biased so as to create a force in the direction of arrow Z (FIG. 37) against the nut 500 (FIG. 37) of the driving device, regardless of the position or direction of travel of the cam flat 480. The driving mechanism chosen for the present embodiment includes a stepping motor 510 with a threaded lead screw 512 which passes through the nut 500.

Note that in the present embodiment, the cam profile 482 is chosen to be very shallow towards the tele position and the force vector of the pin 491 of the zoom lever 490 is nearly zero in the linear direction (not considering friction).

The coupling zoom linkage 498 creates the direct link between the cam flat 480 and the front barrel 460. It is stiff and acts in a push/pull linear manner for precise movement of the front barrel 460, but is flexible for torsion and deflection to compensate for misalignment of the cam flat. The coupling zoom linkage 498 is attached to connector portions 485a and 485b on the side of the cam flat 480, and is similarly attached to the frame of the front lens barrel 460 at connector portions 460a and 460b.

As can be seen from the zoom curve profile, in operation, when the cam flat is advancing away from the motor 510, the directly linked front lens group 460 is additionally advancing away from the motor 510, while the rear group is moving towards the motor 510 and away from the front lens group 460. Similarly, when the cam flat 480 and front lens group 460 are moving towards the motor 510, the rear lens group 470 is moving away from the motor 510 and towards the front lens group 460. As such, it can be seen that during operation of the present particular embodiment, the front and rear lens barrels 460, 470 are always moving in the opposite direction from each other. A finger 465 on the front lens barrel 460 may be used in connection with a photointerrupter (not shown) to inform a processor of the precise location of the lens barrel 460.

One particular method of assembling the mechanism in a simple fashion will be described. In this method, the zoom lever 490 is mounted first, then the barrels 460, 470, and the cam flat 480 is placed last. During assembly, the zoom lever 490 is moved beyond its operational position. At that time the cam flat 480 is slid into place on the housing 450 and the zoom lever 490 is rotated into its position through the open side 483a of the cam profile 483. The coupling zoom linkage 498, is then mounted to the front lens barrel 460 and fixed onto the cam flat 480. Also at this time, the cam drive stepping motor 510 will be engaged with the cam flat 480 at the cam flat yoke 484 and with the nut 500.

It should be understood that other methods of assembling the zoom lens mechanism may be used. Additionally, although in the described embodiment the front barrel 460 is linked to the cam using the cam zoom linkage 498 and the rear barrel 470 using the lever 490, with a slight modification to the cam profile 483, the cam zoom linkage 498 may be used to drive the rear group 470 and the lever 490 used to drive the front group 460.

A Viewfinder Mechanism

Figure 55:
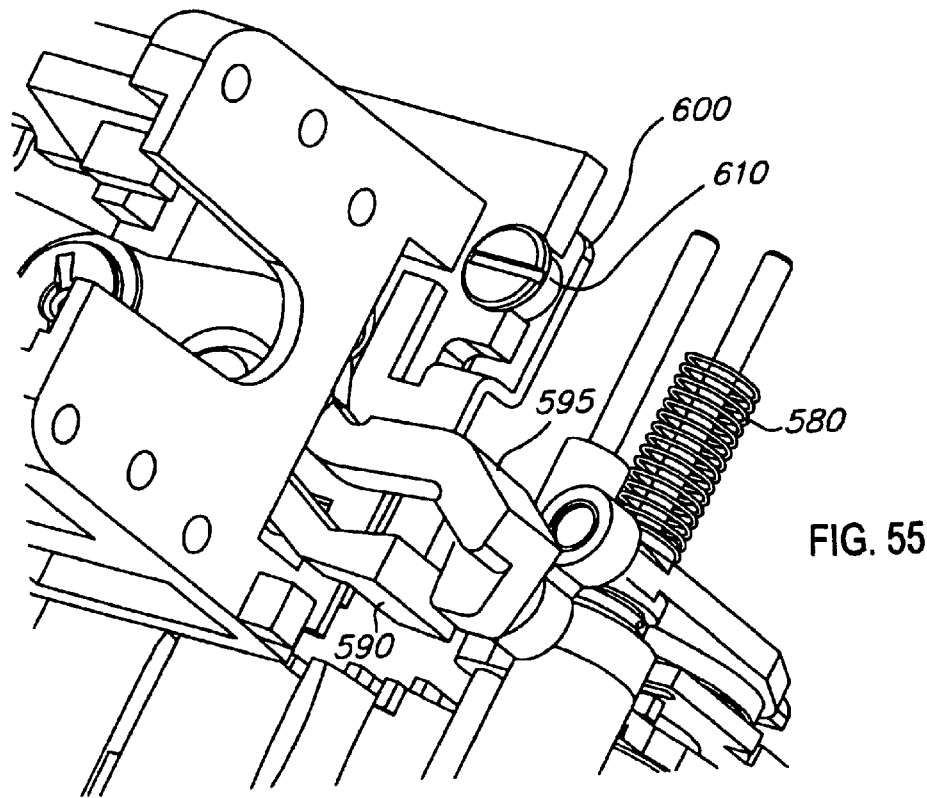
Figure 54:
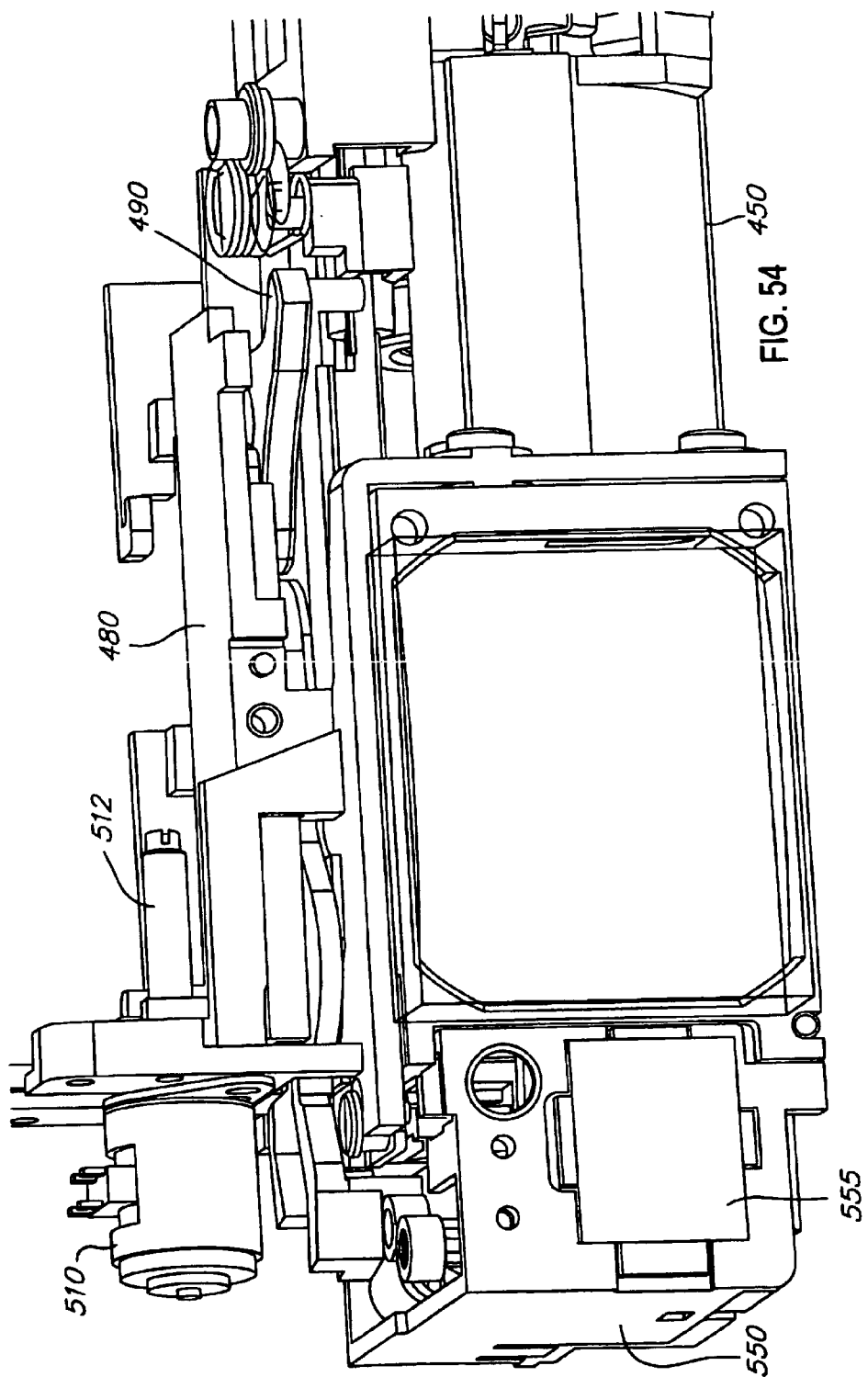

Referring now to FIGS. 47–54, there will be shown a viewfinder mechanism through which the user can view the scene at the same magnification chosen using the zoom mechanism. A viewfinder housing 550 is located adjacent to the zoom housing 450 (see FIG. 55). All viewfinder lenses are captured in the viewfinder housing 550. The viewfinder housing 550 additionally contains two prisms 557, 559, for directing the view of the user around a turn in the housing 550. The middle lens 565 and the rear lens 560 are being guided in the lower portion on pins 575 and 570, which are cylindrical in the present particular embodiment.

In the upper portion, pins 560a and 565a (part of the lenses 560 and 565, respectively) are being guided within a slot (not shown) in the viewfinder cover. An extension spring 580 pushes the rear and the middle lenses 560, 565 apart from one another (See FIGS. 49–51) to allow a constant force on the lens levers 590 and 595. The two lens levers 590 and 595 are captured an adjustment plate 600. Additionally, pins on the free ends of the levers 590, 595 are captured in grooves 486 and 487 on the cam flat 480, respectively. The levers 590, 595 are being driven by the same cam flat 480 as the zoom mechanism, which correspondingly moves the rear and middle lenses 565 and 560 of the viewfinder due to the contact between the lens levers 590, 595 and the lens frame tabs 575a and 565a. As such, as the lens levers 590, 595 move together and apart based on the profiles of the cam grooves 486 and 487 on the cam flat 480, the viewfinder experiences an apparent zooming view that corresponds to the zooming action experienced at the image sensor, due to the cam flat 480 moving the front and rear barrels 460, 470 of the zoom lens mechanism.

The middle lens lever 595 couples to the middle lens 565 by a connector bearing 565a. The arrangement of the connector bearing 565a is such that it always pulls the lenses into one sideways direction, thus preventing an erratic sideways motion of the middle lens 565 during zooming. No additional spring is necessary for the prevention of erratic sideways movement.

The rear lens lever 590 interacts with slanted surface onto the pin of the rear lens, which also prevents sideways motion. As such, the two levers 590, 595 are driving, by means of the cam flat 480, the two movable zoom lenses 560, 565 according to the designated motion with the use of only one spring. The spring 580 is captured in a unique way by forcing the lenses always against the lever bearing connection. Backlash is relatively eliminated and a smooth motion of the viewfinder zoom action is secured. The additional connector bearing piece prevents an erratic sideways motion of the lenses during zoom activation.

Tuning the Viewfinder During Assembly

Figure 56:
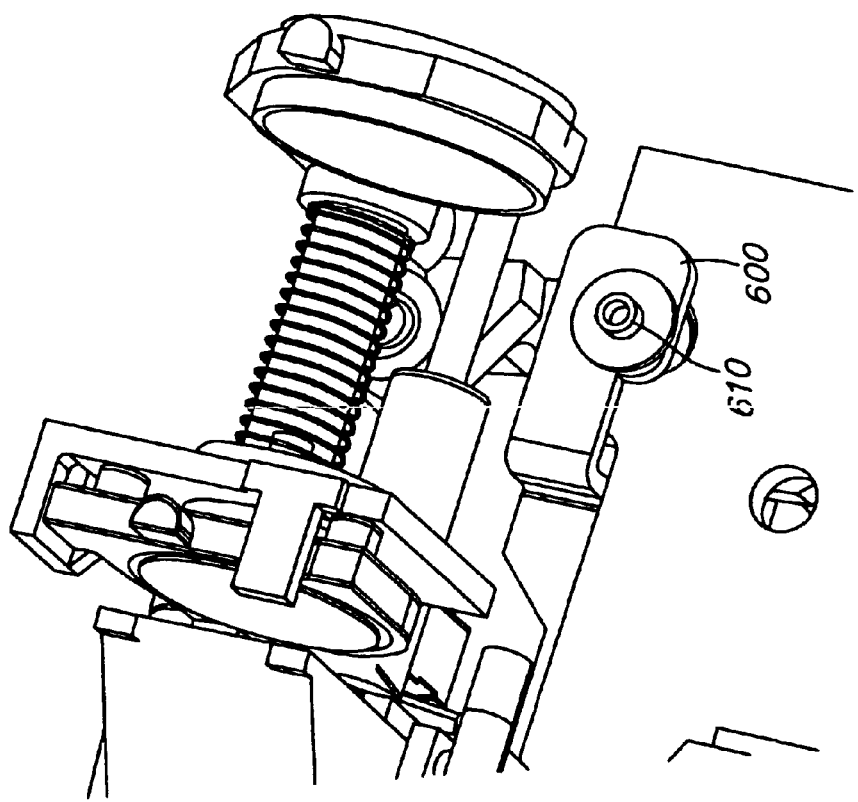
Figure 57:
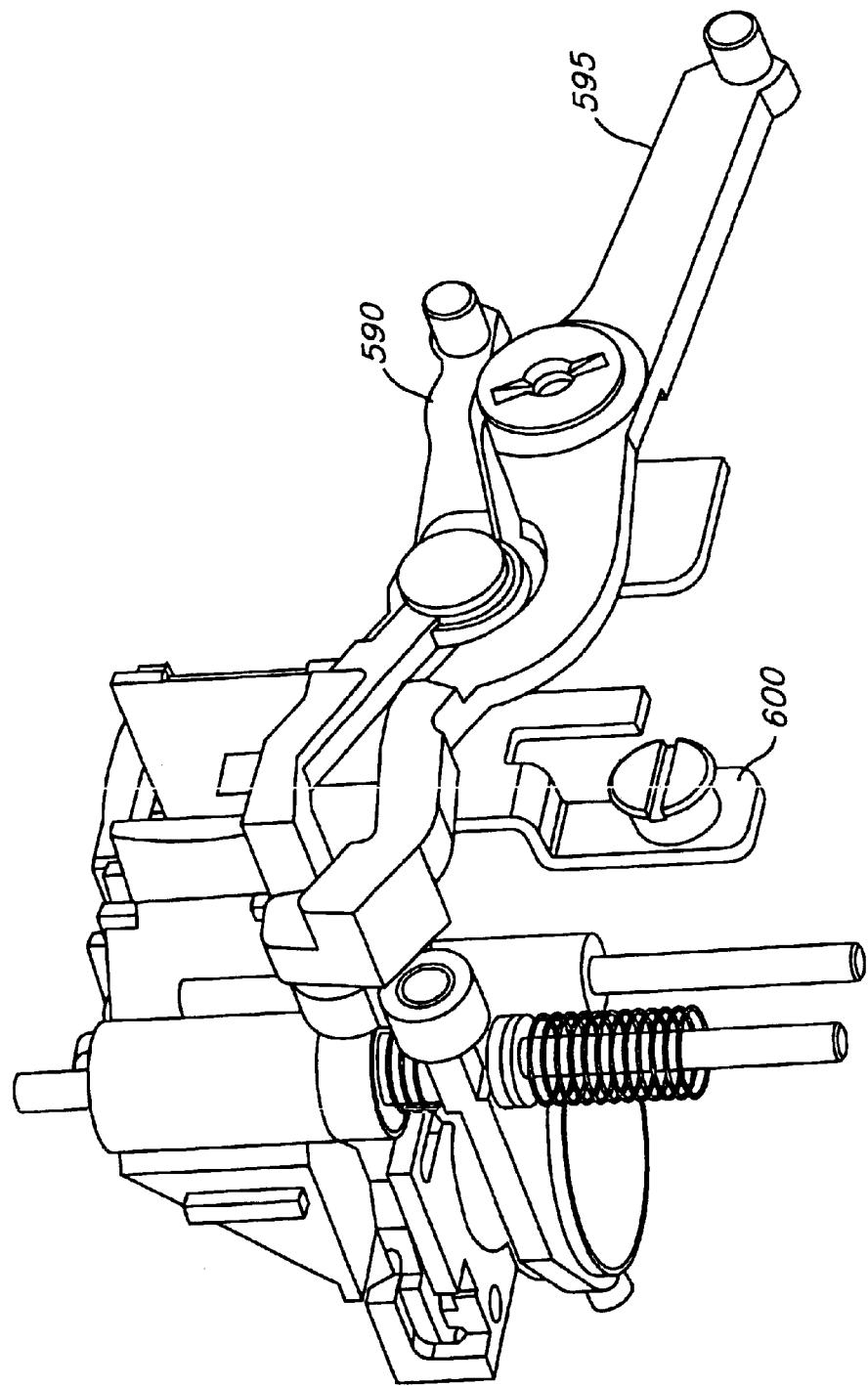

Referring now To FIGS. 56–58, the rear lens lever 590 and the middle lens lever 595 are captured on an adjustment plate 600. The adjustment plate is located on the zoom structure by a bearing rivet 605, although other means of attachment are possible. An accentor pin 610 is riveted to the adjustment plate as well and guided between a slot of the zoom structure. By turning the accentor pin 610 clockwise ore counter-clockwise, the adjustment plate 600 can be rotated around the bearing rivet 605. The rear lens lever 590 can now be moved in a rotary motion and in return, through the connection between the rear lenses, moves the rear lens forward and backwards. The rear lens can now be adjusted in the viewfinder lens system to correct any deviation between the lenses. The accentor pin 610 at the same time is being held by friction (in the present embodiment, by the use of a washer) against unwanted rotation. By mounting the two lens levers 590, 595 on one rotational adjustment plate 600 and by the use of one accentor pin 610, an easy adjustment (using merely a screwdriver, in the present embodiment) of the viewfinder lens system is possible.

A Viewfinder Diopter Adjustment Mechanism

Referring now to FIGS. 4 and 23–25, there is shown one particular embodiment of a viewfinder diopter adjustment mechanism that may be used with an image capture device, such as image capture device 10. The viewfinder eye lens (diopter lens) 32 is adjusted using a knob 28 mounted to the rear housing 14. The eye lens 32 is mounted to the viewfinder housing 550 by means of slot 550a, in which tab 32a is seated. The slot includes enough clearance for the tab 32a to move forward and back, in response to rotation of knob 28. However, rotation of the knob 28 would be limited by the confines of the slot, such that when the tab 32a would hit the front or back end bearing surfaces of the slot, the knob 28 could not be turned further. As will be described below, a detent spring or mechanism may be included to prevent the rotation of the knob to these extremes. The slot bearing area is closed and secured by the viewfinder housing cover (see FIG. 47). Opposite the tab 32a, an arm 325 connects the lens 32 to a bearing pin 310. A protrusion 325a is located on the planar face of the arm 325, opposite the planar face supporting the bearing pin 310.

One end 310a of the bearing pin 310 is located in a cylindrical hole in the viewfinder housing 150. A compression spring 300 mounted coaxially around the bearing pin 310 biasing the protrusion 325a against a rotational cam 28a resembling, a helical ramp, which is incorporated within the diopter knob 28. The rotational cam 28a is located in a bearing hole of the back cover 14 of the image capture device 10. By rotating the diopter knob 28 clockwise or counterclockwise, the cam 28a inside the diopter knob 28 rotates, moving the diopter lens forward or backward, as the protrusion 325a is biased against portions of the ramp having greater or lesser heights. This movement of the diopter lens enables the user to adjust the sharpness of the viewfinder zoom lens system. As can be seen more particularly in FIG. 23, the coil spring 300 is compressed between a bearing shoulder on the bearing pin 310 and the viewfinder housing 150. As the knob 28 is rotated, the compression spring 300 maintains the protrusion 325a in contact with the cam 28a based on the force on the bearing shoulder of the bearing pin 310 compressing or decompressing the spring 300 against the viewfinder housing 150 as the cam ramp 28a height increases or decreases, respectively.

Additionally, a detention spring 320 having a frictional spring arm 320a is connected to the diopter knob 28 against the inner surface 14b of the rear housing 14. The detention spring 320 can be used as a friction position device or as a detent mechanism. The diopter knob 28 may be fastened to the rear cover by means of a heat stake or ultrasonic welding.

Shutter and Aperture Adjustment Mechanism

Referring now to FIGS. 28–36 there is shown one particular embodiment of a shutter/aperture mechanism 350 that may be used with an image capture device, such as image capture device 10. A shutter base component 360 includes guide rail apertures 362a and 362b that, in combination with guide rails 410a and 410b, serve to align the shutter base 360 on the optical axis, with an opening 363 centered on the optical axis. In the present embodiment, a lens 370 is aligned with the opening 363. The base 360 includes pins 364a, 364b, 366a and 366b formed thereon, which are used to locate and/or maintain the shutter and aperture blades 394, 395, 396 and 397 in certain discrete positions, as will be described more completely in connection with FIGS. 30–32. The shutter and aperture assembly 350 is mounted into a barrel 400 within the optical path of the zoom lens. The barrel 400 additionally holds a lens element 370 in the correct position which defines a primary, maximum lens aperture. The shutter and aperture blades 394, 395, 396, 397 are mounted onto the barrel such that the f-stop plane is right in front of the vertex of the lens element 370. The shutter blades 394, 395, as well as the aperture blades 396, 397 are each driven by a solenoid 382, 380, respectively. The solenoids 380, 382 have stable end positions in which they remain without external power to the shutter mechanism.

The arcuate portions 368a and 368b of the shutter base 360 are designed to permit the arms 380a and 382b of the solenoids 380 and 382, to swing in an arc from a first stable, open position to a second powered, closed position. The solenoids 380 and 382 are mounted externally on the lens body tube structure 400 and the solenoid drive pins 380a and 382a pass through slots 394a, 395a, 396a, 397a of the respective blade groups. This design results in a compact shutter build.

The shutter group is realized with one main blade 394 and one supporting blade 395. The main blade 394 has a reduced size that does not cover the entire optical opening 363 when the solenoid 382 is energized. Rather, the supporting blade 395 covers the remaining area as shown more particularly in FIG. 31. This produces a subassembly with small outer dimensions. For example, in the present embodiment, the shutter mechanism is located in the camera such that the shutter blades open in the width direction of the camera. As such, a larger shutter blade(s) would require a greater width dimension when the shutter blade(s) swung open.

In one particular embodiment, the ratio of main blade 394 average width to supporting blade 395 average width is about 3:1. In another particular embodiment the ratio of main blade 394 average width to supporting blade 395 average width is about 2:1.

Figure 31:
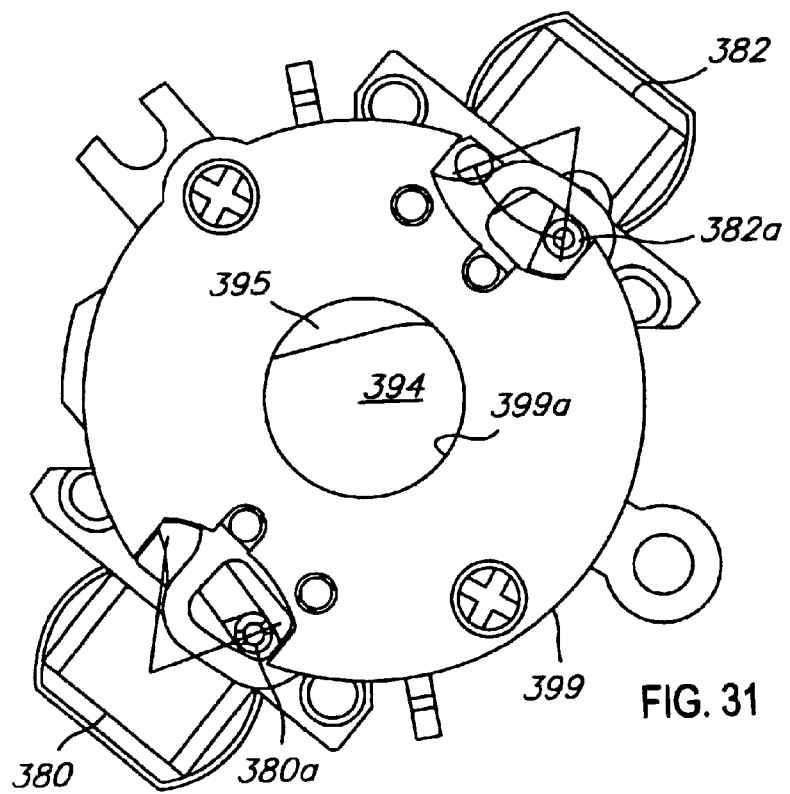

The main blade 394 is pivoted on the pin 364b, which passes through the hole 394b while the supporting blade 395 moves linearly on the pins 366a and 366b, when the solenoid 382 is energized, as shown in FIG. 31.

Figure 34:
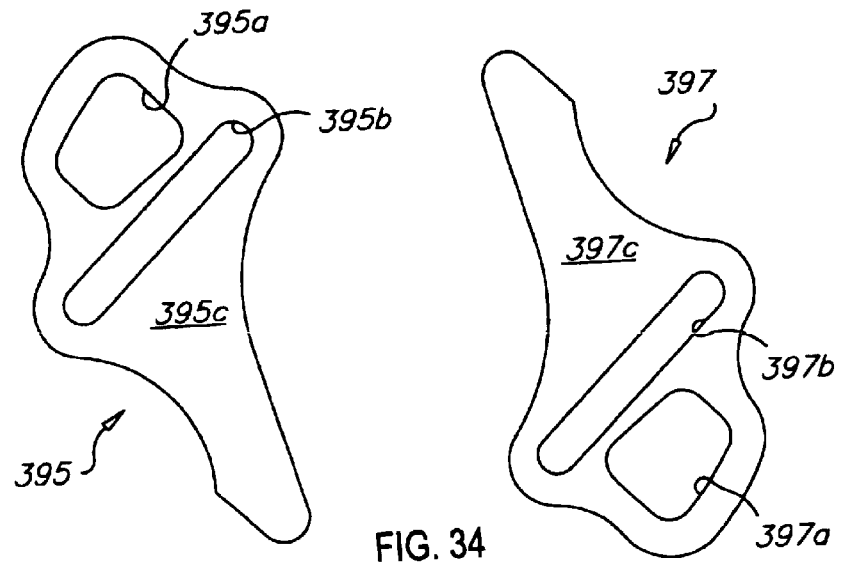

The same principle applies for the aperture group with the main difference being that the main blade 396 provides in the closed stage a small opening which creates the smaller aperture therethrough. Referring more particularly to FIGS. 32, 33b and 34, it can be seen that when the solenoid arm 380a swings to its second, energized position, the aperture blade 396 covers a portion of the lens 370, wherein the supporting blade 397 covers another portion of the lens 370, leaving only the aperture 396d through the main blade 396 open to permit light through the lens 370. As with the main shutter blade 394, the main aperture blade 396 pivots on a pin 364b and the supporting blade 397 moves linearly on the pins 364a and 364b, when the solenoid 380 is energized. Additionally, in one particular embodiment, the ratio of the aperture blade 396 average width to supporting blade 397 average width is about 3:1. In another particular embodiment the ratio of the aperture blade 396 average width to supporting blade 397 average width is about 2:1.

Figure 30:
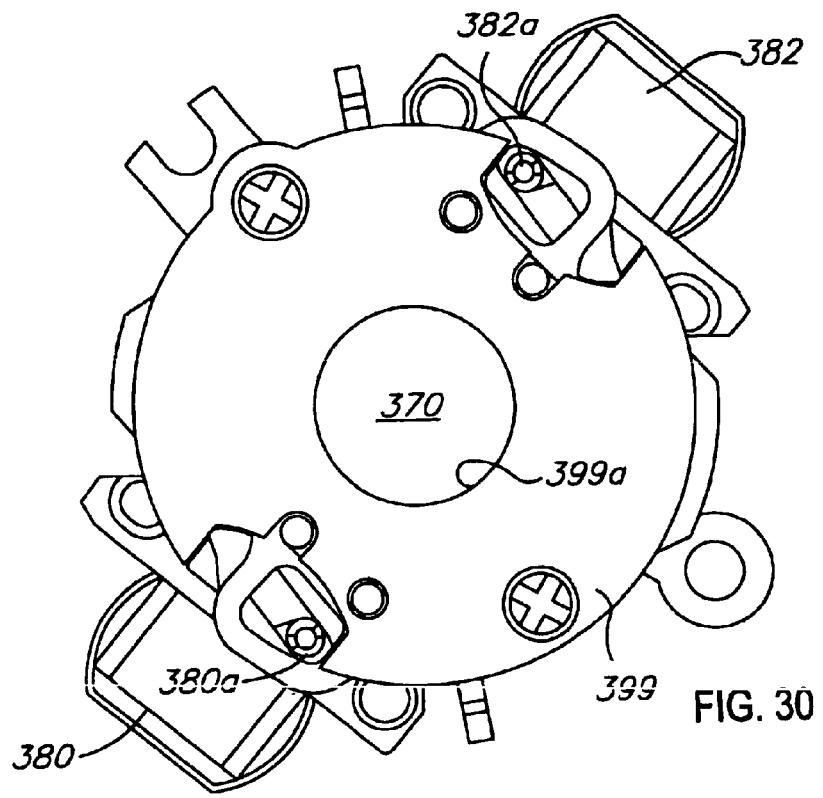

As shown in FIG. 30, the present particular embodiment has been shown wherein when both solenoids 380 and 382 are in the stable position, the aperture is at "full open" i.e. neither the shutter blades 394 and 395 or the aperture blades 396 or 397 cover the lens 370. In one particular embodiment, full open represents, for example, 2.8 while the small opening represents, for example, 5.6. The two aperture values are useful for increasing the depth of field, improvement of optical quality and to aid the flash system at close distances.

In the present embodiment, aperture is normally open to light. When a signal is received indicating that the release button (22 of FIG. 1) has been depressed, the main shutter blade 394, and its supporting blade 395 are closed. If, prior to depression of the release button 22 it is determined that less light needs to pass through the aperture, such as to more greatly define field of depth or in highly lit environments, then the main aperture blade 396 and supporting blade 397 cover the lens 370, defining a smaller aperture. As with the full aperture embodiment, when the release button 22 is depressed, the shutter blades 394 and 395 are closed. However, since they are not located in the same plane as aperture blades 396 and 397, and may even be offset by separation sheets (not shown), a collision between the various blades is avoided. The blades 394, 395, 396 and 397 are additionally secured in place by the cover 399, which is fastened to the shutter base 360. Each set of shutter blades 394, 395 and aperture set of blades 396, 397 can be driven independently or in combination based on the actuation of the solenoids 380 and 382. Note that although we have defined a stable and energized state for each of the shutter and aperture subassemblies, the solenoid states could be assigned differently in software and/or hardware but accomplish the same functions of providing a full open, a small aperture and a closed position, if desired.

Figure 35:
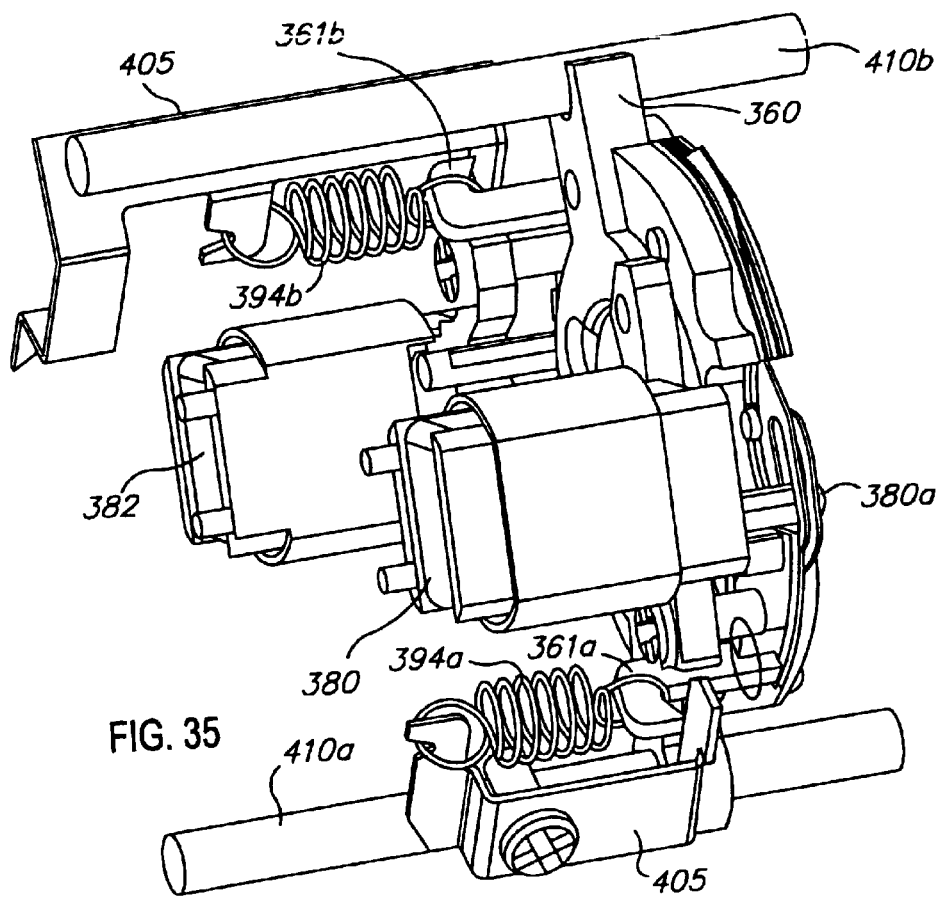
Figure 36:
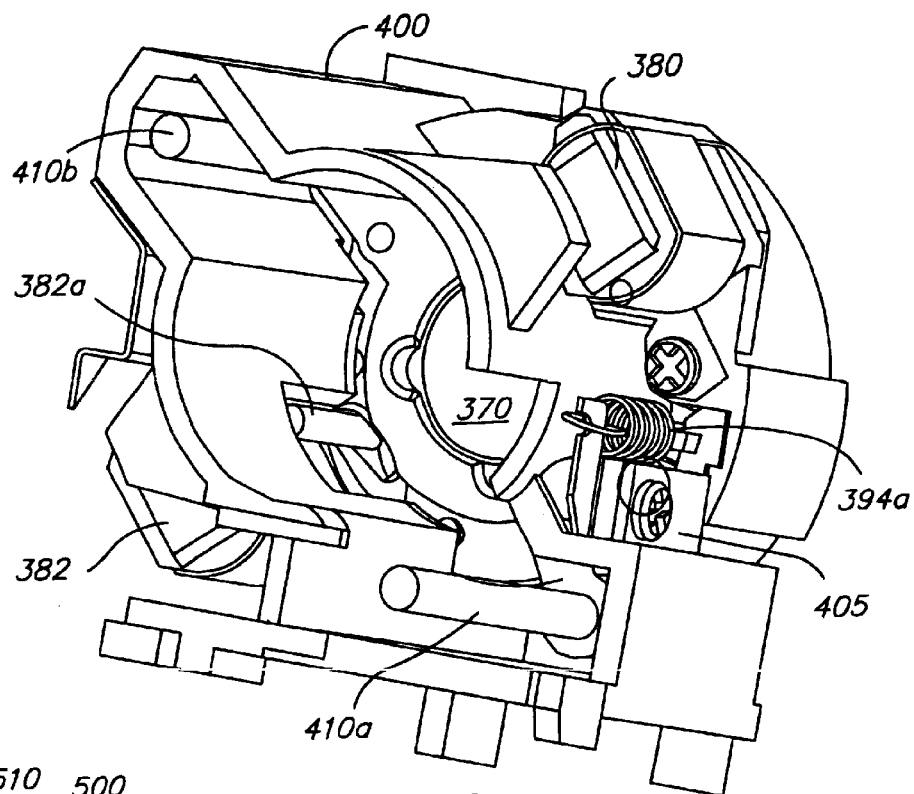
Figure 37:
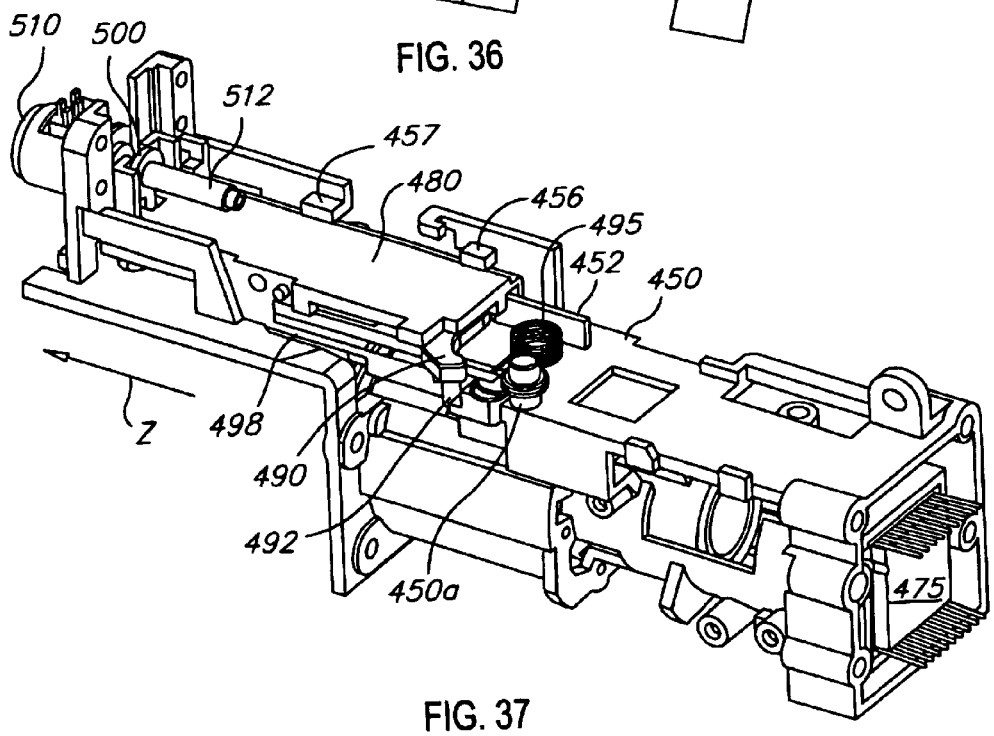
Figure 38A:
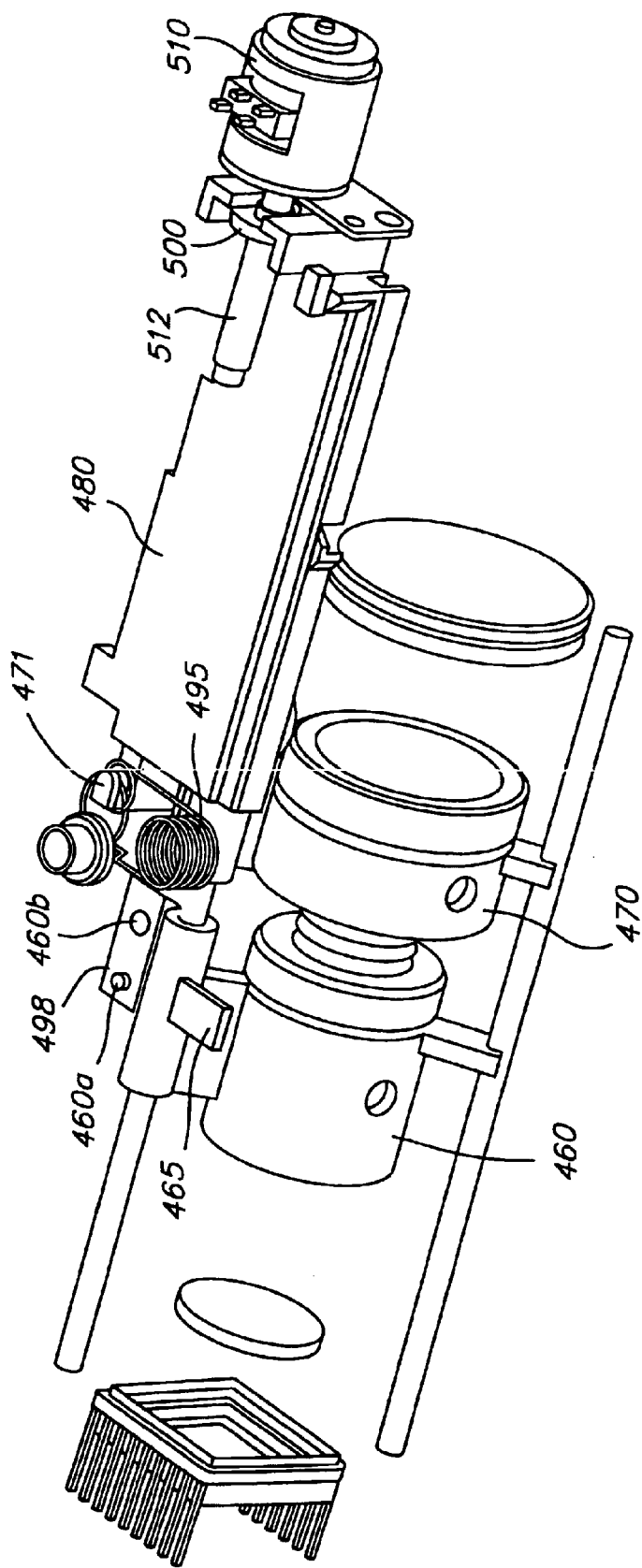
Figure 38B:
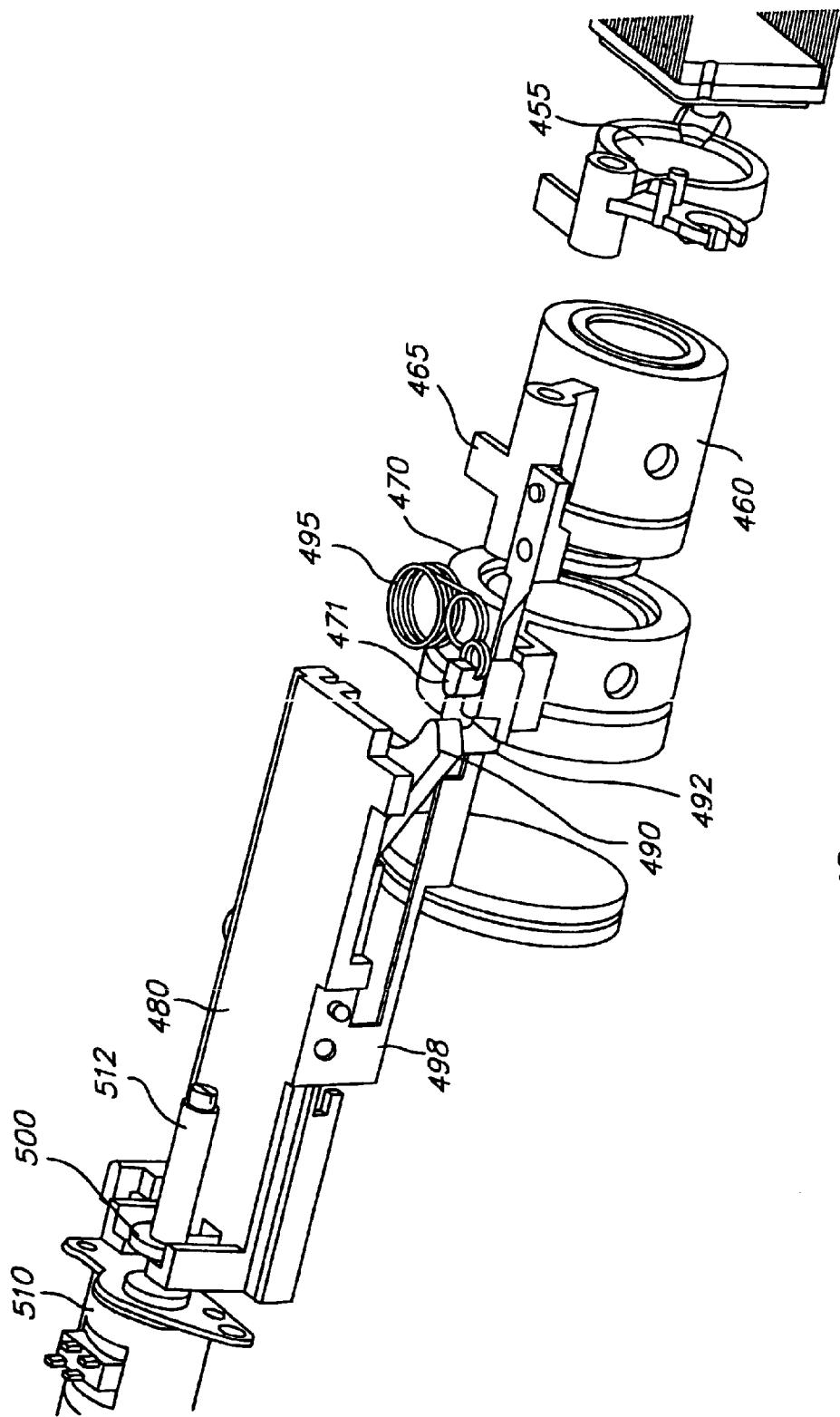
Figure 39:
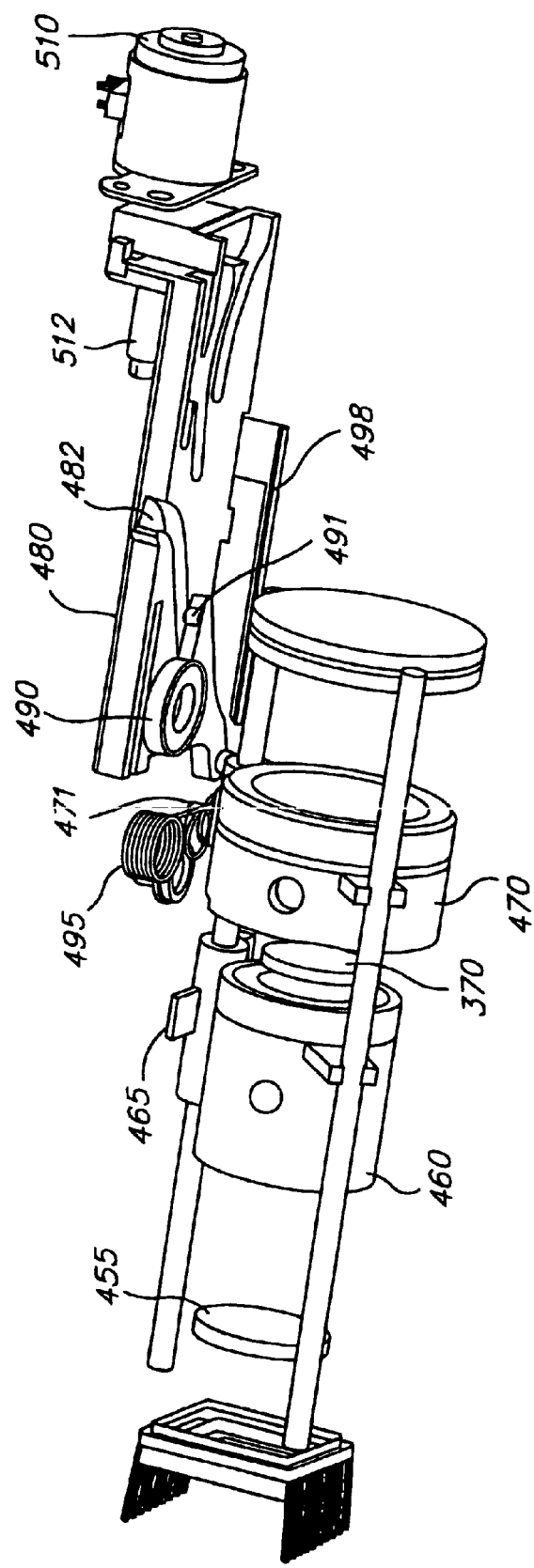

Referring more particularly to FIGS. 35 and 36, as noted above, in the present particular embodiment a lens element 370 is additionally positioned inside the barrel 400. This requires a precise optical alignment of the shutter barrel elements, which can be effected in the present particular embodiment because the barrel is positioned on the guide pins 410a and 410b. Additionally, in the present particular embodiment, the heavy solenoids 380 and 382 are mounted onto the outer fixed structure 400 so that the shutter/aperture subassembly mass is respectively minimal. When the external solenoids 380 and 382 are activated they will still transfer some energy into the shutter/aperture assembly 350. This is due to the acceleration of the blades 394, 395, 396, 397 and some friction. This energy is absorbed by the alignment system 350 and a friction damping assembly 405 which includes the external tension springs 394a and 394b, which are connected to the shutter base 360 at the hooks 361a, 361b. The friction damping assembly 405 pulls the shutter/aperture assembly 350 in an axial direction against a reference surface (for optical reasons) of the lens body tube structure. The spring force is weak enough to allow the guide pins 410a and 410b to keep their straightness after the external shock, but strong enough to generate the beneficial damping.

It should be recognized that, although the above shutter embodiment is described in connection with a digital camera wherein the shutter is closed to capture an image, the above shutter embodiment can be adapted to be used in connection with a film camera. To do so, the shutter blades 394 and 395 are normally closed over the lens 370. The solenoid 380 can then be pulsed to momentarily open the shutter blades 394 and 395 to permit light to come through the lens 370. The aperture blades 396 and 397 and solenoid 382 would operate as described above in connection with the digital embodiment.

While the invention has been described with reference to certain embodiments, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A shutter mechanism for a camera including a release button, comprising
    a shutter base component defining a lens aperture opening of a first size therethrough;
    a single main shutter blade pivotally fixed to close over a portion of said lens aperture opening;
    a single supporting shutter blade moveably fixed to close over a portion of said lens aperture opening;
    a drive mechanism operated in response to actuation of the release button, wherein said drive mechanism simultaneously moves said main shutter blade and said supporting shutter blade between an open lens aperture position and a closed lens aperture position; and
    wherein said main shutter blade covers a substantially greater percentage of said lens aperture opening than does said supporting shutter blade, and wherein, said single main shutter blade and said single supporting shutter blade, in combination, cover said lens aperture opening.

2. The shutter mechanism of claim 1, wherein said main shutter blade and said supporting shutter blade are normally open to expose said lens aperture opening to light and wherein said drive mechanism is operated to close said main shutter blade and said supporting shutter blade over said lens aperture opening in response to actuation of the release button.

3. The shutter mechanism of claim 2, wherein said drive mechanism includes a first solenoid and a first solenoid drive pin, said first solenoid drive pin being in communication with said main shutter blade.

4. The shutter mechanism of claim 3, wherein said first solenoid drive pin is additionally in communication with said supporting shutter blade in order to slide said supporting shutter blade linearly when said first solenoid drive pin is moved.

5. The shutter mechanism of claim 4, additionally including a main aperture blade pivotally fixed to close over a portion of said lens aperture opening and a supporting aperture blade fixed to close over a portion of said lens aperture opening, said main aperture blade being located in a different plane from said main shutter blade and including a hole therethrough, wherein said main aperture blade covers a substantially greater percentage of said lens aperture opening than said supporting aperture blade when closed over said lens aperture opening.

6. The shutter mechanism of claim 5, wherein said drive mechanism additionally includes a second solenoid and a second solenoid drive pin in communication with said main aperture blade and said supporting aperture blade.

7. The shutter mechanism of claim 6, additionally including an aperture operating mechanism that operates said second solenoid to simultaneously move said main aperture blade and said supporting aperture blade to change the size of said lens aperture opening and after moving said main and supporting aperture blades, operates said first solenoid in response to actuation of the release button, to simultaneously close said main and supporting shutter blades.

8. The shutter mechanism of claim 1, wherein said shutter mechanism additionally includes an alignment system and a damping system, said alignment system including a guide rail which passes through an alignment hole on said shutter base component to align said shutter base component on said optical axis, and wherein said damping system includes a spring connected between said shutter base component and a fixed point in said camera.

9. The shutter mechanism of claim 8, wherein said alignment system further includes a second guide rail passing through a second alignment hole in said shutter base component and said damping system further includes a second spring connected between said shutter base component and a fixed point in said camera, wherein said springs are fixed parallel to said optical axis.

10. A method of capturing an image, comprising:
(a) providing an image capture device including a lens, a release button, an an image capture medium, and a shutter optically aligned between said lens and said image capture medium, said shutter including,
a shutter base component defining a lens aperture opening of a first size therethrough;
a single main shutter blade pivotally fixed to close over a portion of said lens aperture opening;
a single supporting shutter blade moveably fixed to close over a portion of said lens aperture opening;
a drive mechanism that simultaneously moves said main shutter blade and said supporting shutter blade between an open lens aperture position and a closed lens aperture position; and
wherein said main shutter blade covers a substantially greater percentage of said lens aperture opening than does said supporting shutter blade, and wherein, said single main shutter blade and said single supporting shutter blade, in combination, cover said lens aperture opening;
(b) activating said release button; and
(c) moving said main shutter blade and said supporting shutter blade simultaneously in response to activation of said release button.

11. The method of claim 10, wherein said image capture medium is electronic image sensor and wherein said main shutter blade and said supporting shutter blade are normally open and said drive mechanism closes said main shutter blade and said supporting shutter blade over said lens aperture opening in response to actuation of said release button.

12. The method of claim 11, wherein said drive mechanism includes a first solenoid and a first solenoid drive pin engaged with said main shutter blade and with said supporting shutter blade to pivot said main shutter blade and slide said supporting shutter blade over said lens aperture opening in response to actuation of said release button.

13. The method of claim 12, additionally including a main aperture blade pivotally fixed to close over a portion of said lens aperture opening and a supporting aperture blade fixed to close over a portion of said lens aperture opening, said main aperture blade being located in a different plane from said main shutter blade and including a hole therethrough, wherein said main aperture blade covers a substantially greater percentage of said lens aperture opening than said supporting aperture blade when closed over said lens aperture opening.

14. The method of claim 13, wherein said drive mechanism additionally includes a second solenoid and a second solenoid drive pin in communication with said main aperture blade and said supporting aperture blade.

15. An image capture device having a rotary to linear switch, comprising:
an image capture device housing including a window therethrough and a detent assembly in fixed relationship therewith;
a linear switch including a switch actuator, said linear switch located within said image capture device housing and having a plurality of discrete switch positions determined by the position of said switch actuator;
a switch gear located outside said image capture device housing and rotatably affixed thereto, said switch gear including fixed thereto, a projection which passes through said window and directly captures said switch actuator therein, wherein said switch gear includes an open portion on the inner circumference thereof, said detent assembly being located within said open portion, and wherein said open portion includes a plurality of detent notches, each one of said detent notches corresponding to one of said plurality of discrete switch positions;
wherein rotation of said switch gear moves said switch actuator linearly between said plurality of discrete switch positions; and
wherein said switch gear is locked into place at a desired discrete switch position by said detent assembly engaging one of said detent notches corresponding to said desired discrete switch position.

16. The image capture device of claim 15, wherein said detent mechanism includes a spring and a detent cap, wherein said detent cap is spring biased by said spring to cooperate with said detent notches.

17. The image capture device of claim 16, wherein said camera housing includes a bearing surface upon which said switch gear is mounted, said bearing surface including a walled channel located within said open portion of said switch gear, at least a portion of said spring being located within said walled channel.

18. The image capture device of claim 17, further including a joystick nested within the center of said switch gear.

19. The image capture device of claim 18, wherein said joystick is a five position joystick.

* * * * *